United States Patent
Usui et al.

(10) Patent No.: US 9,832,701 B2
(45) Date of Patent: Nov. 28, 2017

(54) RADIO COMMUNICATION APPARATUS, RADIO COMMUNICATION METHOD, COMMUNICATION CONTROL APPARATUS, AND COMMUNICATION CONTROL METHOD TO SWITCH OPERATION MODE BASED ON FAILURE OF HANDOVER

(71) Applicant: SONY CORPORATION, Tokyo (JP)

(72) Inventors: Takashi Usui, Tokyo (JP); Ryota Kimura, Tokyo (JP); Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/025,187

(22) PCT Filed: Aug. 25, 2014

(86) PCT No.: PCT/JP2014/072192
§ 371 (c)(1),
(2) Date: Mar. 25, 2016

(87) PCT Pub. No.: WO2015/053000
PCT Pub. Date: Apr. 16, 2015

(65) Prior Publication Data
US 2016/0249268 A1  Aug. 25, 2016

(30) Foreign Application Priority Data
Oct. 8, 2013  (JP) .................. 2013-211280

(51) Int. Cl.
*H04W 36/20*  (2009.01)
*H04W 36/30*  (2009.01)
(Continued)

(52) U.S. Cl.
CPC ........... *H04W 36/30* (2013.01); *H04W 16/32* (2013.01); *H04W 36/08* (2013.01);
(Continued)

(58) Field of Classification Search
CPC ........................... H04W 84/045; H04W 36/04
See application file for complete search history.

(56) References Cited

U.S. PATENT DOCUMENTS

2009/0186615 A1* 7/2009 Kwon ............... H04W 36/04
455/436
2011/0092234 A1* 4/2011 Kim ..................... H04W 48/14
455/507
(Continued)

FOREIGN PATENT DOCUMENTS

| JP | 2009-253569 A | 10/2009 |
|---|---|---|
| JP | 2011-049859 A | 3/2011 |
| JP | 2013-518520 A | 5/2013 |
| JP | 2013-520032 A | 5/2013 |

*Primary Examiner* — Nathan Mitchell
*Assistant Examiner* — Ernest Tacsik
(74) *Attorney, Agent, or Firm* — Chip Law Group

(57) ABSTRACT

[Object] To be able to detect a terminal in the vicinity of a small cell base station and appropriately provide an opportunity for handover even when the small cell base station is put into a standby state.

[Solution] Provided is a radio communication apparatus including: a radio communication unit configured to provide radio communication service to one or more terminals within a second cell which overlaps with a first cell; a detecting unit configured to detect a terminal existing in the vicinity by monitoring strength of an uplink signal transmitted in the first cell while an operation mode of the radio communication unit is set at a standby mode; and a mode setting unit configured to switch the operation mode of the radio communication unit to an active mode when the detecting unit detects the terminal existing in the vicinity.

20 Claims, 19 Drawing Sheets

(51) Int. Cl.
*H04W 16/32* (2009.01)
*H04W 84/10* (2009.01)
*H04W 52/02* (2009.01)
*H04W 36/08* (2009.01)
*H04W 72/04* (2009.01)
*H04W 36/00* (2009.01)
*H04W 88/08* (2009.01)
*H04W 76/04* (2009.01)

(52) U.S. Cl.
CPC ... *H04W 52/0206* (2013.01); *H04W 72/0413* (2013.01); *H04W 84/10* (2013.01); *H04W 36/00* (2013.01); *H04W 52/0251* (2013.01); *H04W 76/046* (2013.01); *H04W 88/08* (2013.01); *Y02B 60/50* (2013.01)

(56) References Cited

U.S. PATENT DOCUMENTS

| | | | | |
|---|---|---|---|---|
| 2011/0128916 A1* | 6/2011 | Kwon | ................... | H04W 84/18 |
| | | | | 370/328 |
| 2011/0275361 A1* | 11/2011 | Yavuz | ................. | H04W 52/143 |
| | | | | 455/422.1 |
| 2012/0094665 A1* | 4/2012 | Soliman | ............... | H04W 48/16 |
| | | | | 455/435.1 |
| 2012/0115460 A1* | 5/2012 | Lin | ................... | H04W 36/0083 |
| | | | | 455/423 |
| 2012/0149374 A1* | 6/2012 | Morita | ................. | H04W 36/04 |
| | | | | 455/436 |

\* cited by examiner

<--- : Uplink Signal    <•••• : Movement of UE

← ― : Downlink Signal
← ― : Backhaul Signal

FIG.12

| 432 CELL ID | 433 RELATED MACRO CELL | 434 BS LOCATION | 435 CURRENT MODE | 436 CLUSTER ID | 437 ACTIVATION PRIORITY |
|---|---|---|---|---|---|
| MC1 | | $(X_{M1}, Y_{M1})$ | | | |
| MC2 | | $(X_{M2}, Y_{M2})$ | | | |
| .. | .. | .. | .. | .. | .. |
| SC1 | MC1 | $(X_{S1}, Y_{S1})$ | Active | CL11 | 1 |
| SC2 | MC1 | $(X_{S2}, Y_{S2})$ | Standby | CL11 | 2 |
| SC3 | MC1 | $(X_{S3}, Y_{S3})$ | Standby | CL11 | 3 |
| SC4 | MC1 | $(X_{S4}, Y_{S4})$ | Standby | CL12 | 1 |
| SC5 | MC1 | $(X_{S5}, Y_{S5})$ | Sleep | CL12 | 2 |
| .. | .. | .. | .. | .. | .. |

431

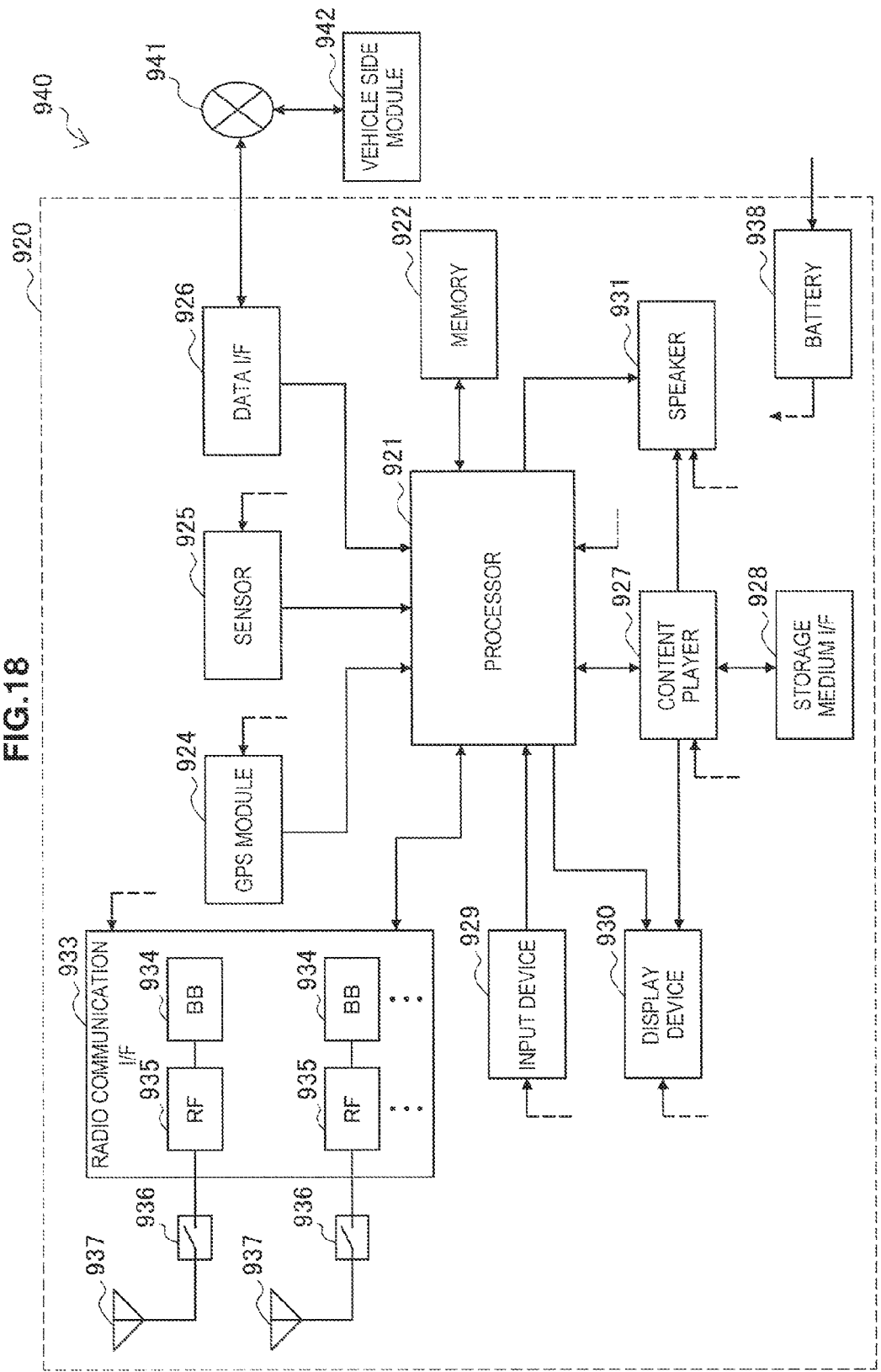

RADIO COMMUNICATION APPARATUS, RADIO COMMUNICATION METHOD, COMMUNICATION CONTROL APPARATUS, AND COMMUNICATION CONTROL METHOD TO SWITCH OPERATION MODE BASED ON FAILURE OF HANDOVER

TECHNICAL FIELD

The present disclosure relates to a radio communication apparatus, a radio communication method, a communication control apparatus, and a communication control method.

BACKGROUND ART

A traffic amount handled in radio communication service has increased rapidly in recent years. A user now can download large scale data such as music data and video streaming data from a network on a radio channel. Capacity of a cellular communication system has been improved to achieve a peak data rate of 100 Mbps or higher in downlink by introduction of long term evolution (LTE) which is positioned as 3.9th generation. In the fourth generation mobile phone service which is scheduled to be in practical use around 2015, it is expected that a data rate of 1 Gbps at a maximum in a semi-fixed environment and 100 Mbps at a maximum in a mobile environment can be achieved. However, because development of a cellular communication system does not catch up with increase of traffic, there still remains a risk of local degradation of a data rate due to increase of system load and occurrence of a network failure. Non-Patent Literature 1 proposes active utilization of a small cell as one of measures against such a risk.

While macro cells which have a relatively large cell size, are disposed adjacent to each other so as to cover a wide geographical region, small cells are normally disposed so as to locally cover a location where a radio wave of the macro cell is weak or traffic concentrates. A small cell can be used to complement radio communication service by a macro cell or provide specific service. A terminal hands over from a macro cell to a small cell, so that the terminal can achieve more favorable communication quality and a higher data rate.

However, when the number of small cells operating within a service area of a macro cell increases, radio signals from more near cells act on a radio signal of one cell as interference. Therefore, it is desirable that a base station of the small cell refrains from transmitting a signal as much as possible under circumstances where there is no terminal within the own cell or a high data rate is not requested. For example, Patent Literature 1 proposes a technique of stopping transmission of a radio signal from a small cell base station under circumstances where there is no terminal in the vicinity.

CITATION LIST

Patent Literature

Patent Literature 1: JP 2011-91748A

Non-Patent Literature

Non-Patent Literature 1: NTT DOCOMO, "Text Proposal for TR36.923 on Small Cell Enhancement Scenarios", 3GPP TSG RAN WG1 Meeting #72, R1-130748, Jan. 28-Feb. 1, 2013

SUMMARY OF INVENTION

Technical Problem

However, when a radio signal is not transmitted from a base station of one small cell, it is difficult for a terminal to recognize presence of the small cell. Handover between cells is normally based on measurement of communication quality of a downlink signal from each cell, executed at each terminal. If the terminal does not recognize the presence of the small cell, because measurement is not executed for the small cell, an opportunity for handover to the small cell is lost.

To address the above-described problem, Patent Literature 1 discloses a method for determining presence of a terminal located in the vicinity of a small cell base station by a macro cell base station collecting location data of the terminal positioned using a global positioning system (GPS). However, positioning accuracy of the GPS is not sufficiently high compared to a cell size of the small cell. Further, the terminal cannot always receive a GPS signal indoors where small cells are often disposed. Therefore, it is difficult to say that the existing solution practically solves the above-described problem regarding recognition of a small cell which is put into a standby state.

An object of a technique according to the present disclosure is to provide an improved mechanism which focuses attention on the above-described problem and which enables a terminal in the vicinity of a small cell base station to be detected and an opportunity for handover to be appropriately provided even when the small cell base station is put into a standby state.

Solution to Problem

According to the present disclosure, there is provided a radio communication apparatus including: a radio communication unit configured to provide radio communication service to one or more terminals within a second cell which overlaps with a first cell; a detecting unit configured to detect a terminal existing in the vicinity by monitoring strength of an uplink signal transmitted in the first cell while an operation mode of the radio communication unit is set at a standby mode; and a mode setting unit configured to switch the operation mode of the radio communication unit to an active mode when the detecting unit detects the terminal existing in the vicinity.

According to the present disclosure, there is provided a radio communication method of a radio communication apparatus, the method including: detecting a terminal existing in the vicinity by monitoring strength of an uplink signal transmitted in the first cell while an operation mode of the radio communication apparatus is set at a standby mode, the radio communication apparatus providing radio communication service to one or more terminals in a second cell which overlaps with a first cell; and switching the operation mode of the radio communication apparatus to an active mode when the terminal existing in the vicinity is detected.

According to the present disclosure, there is provided a communication control apparatus including: a communication unit configured to receive, from a radio communication apparatus, a message indicating that a terminal existing in the vicinity of the radio communication apparatus is detected while the radio communication apparatus is set at a standby mode, the radio communication apparatus providing radio communication service to one or more terminals within a second cell which overlaps with a first cell; and a control unit configured to instruct at least one terminal connected to the first cell to perform measurement in response to reception of the message.

According to the present disclosure, there is provided a communication control method of a communication control apparatus, the method including: receiving, from a radio communication apparatus, a message indicating that a terminal existing in the vicinity of the radio communication apparatus is detected while the radio communication is set at a standby mode, the radio communication apparatus providing radio communication service to one or more terminals within a second cell which overlaps with a first cell; and instructing at least one terminal connected to the first cell to perform measurement in response to reception of the message.

Advantageous Effects of Invention

According to the technique according to the present disclosure, it is possible to detect a terminal in the vicinity of a small cell base station and appropriately provide an opportunity for handover even when the small cell base station is put into a standby state.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 12 is an explanatory diagram illustrating one example of a structure of cell data.

FIG. 18 is a block diagram illustrating an example of a schematic configuration of a car navigation apparatus.

DESCRIPTION OF EMBODIMENTS

Hereinafter, a preferred embodiment of the present disclosure will be described in detail with reference to the appended drawings. In this specification and the drawings, elements that have substantially the same function and structure are denoted with the same reference signs, and repeated explanation is omitted.

Further, description will be provided in the following order.

Figure 1:
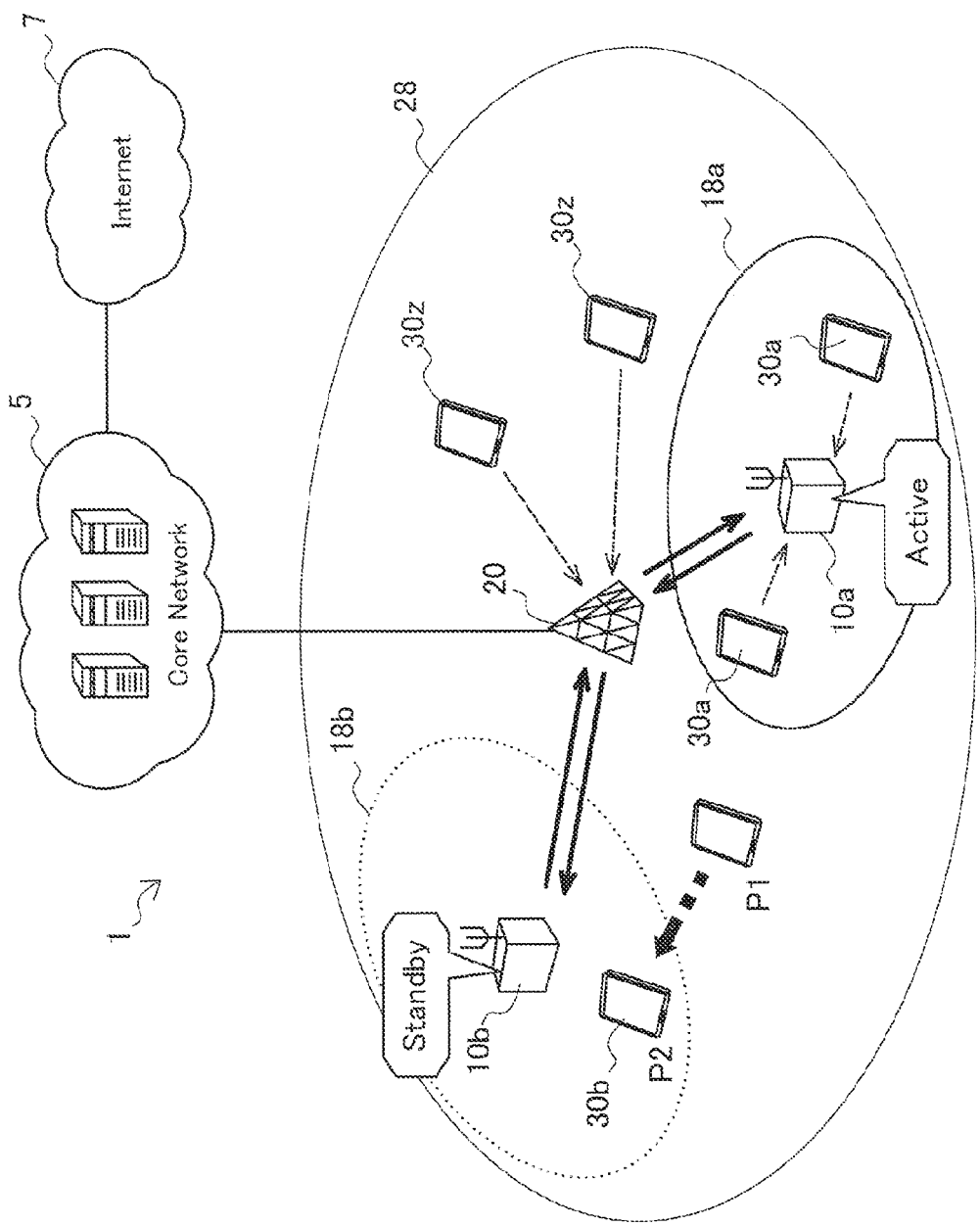
FIG. 1 is an explanatory diagram for explaining outline of a radio communication system to which a technique according to the present disclosure is to be applied.

1. Outline of System
2. First Embodiment
2-1. Configuration Example of Small Cell Base Station
2-2. Configuration Example of Macro Cell Base Station
2-3. Processing Flow
3. Second Embodiment
3-1. Outline of Small Cell Cluster
3-2. Configuration Example of Small Cell Base Station
3-3. Configuration Example of Macro Cell Base Station
3-4. Management of Cell Data
3-5. Processing Flow
4. Application Example
5. Conclusion 1. Outline of System FIG. 1 is an explanatory diagram for explaining outline of a radio communication system 1 to which a technique according to the present disclosure is applied. Referring to FIG. 1, the radio communication system 1 includes small cell base stations 10a and 10b, a macro cell base station 20 and terminal apparatuses 30a, 30b and 30z. It should be noted that the number of macro cell base stations, the number of small cell base stations and the number of terminal apparatuses included in the radio communication system 1 are not limited to the example in FIG. 1. For example, the radio communication system 1 may include two or more macro cell base stations.

The macro cell base station 20 is a base station which provides first radio communication service within a macro cell 28. The macro cell base station 20 can operate the macro cell 28, for example, by being legally approved, or by utilizing a frequency channel for which right of use or right of preferential use is provided. The macro cell base station 20 may operate the macro cell 28 using a frequency division duplex (FDD) scheme, or may operate the macro cell 28 using a time division duplex (TDD) scheme. The terminal apparatuses located within the macro cell 28 can be connected to the macro cell base station 20. In the example of FIG. 1, a plurality of terminal apparatuses 30z are connected to the macro cell base station 20.

The small cell base stations 10a and 10b are respectively base stations which provide second radio communication service within the macro cell 28. In the present specification, the small cell is concept including various kinds of cells such as a femto cell, a nano cell, a pico cell and a micro cell, which are typically smaller than the macro cell. The second radio communication service may be radio communication service substantially equivalent to the first radio communication service, which increases capacity of the first radio communication service, for example, at a hot spot. Alternatively, the second radio communication service may be radio communication service different from the first radio communication service (for example, in terms of a frequency band being used, a radio access technique or a service provider). The second radio communication service may be provided by secondarily utilizing a frequency channel for the first radio communication service. The terminal apparatus 30a located within the small cell 18a can be connected to the small cell base station 10a. The terminal apparatus 30b located within the small cell 18b can be connected to the small cell base station 10b. In the example of FIG. 1, two terminal apparatuses 30a are connected to the small cell base station 10a.

It should be noted that in the present specification, when it is not necessary to distinguish between the small cell base stations 10a and 10b, by abbreviating an alphabetical character at the tail end of the reference numeral, these are collectively referred to as a small cell base station 10. The same will also apply to other components such as the small cells 18a and 18b (small cell 18) and terminal apparatuses 30a, 30b, and 30z (terminal apparatus 30).

The radio communication service of the macro cell and the small cell may be respectively radio communication service complying with a cellular communication scheme such as global system for mobile communications (GSM), a universal mobile telecommunications system (UMTS) (W-CDMA), long term evolution (LTE), LTE-Advanced (LTE-A), CDMA 2000 (EV-DO) and WiMAX. Alternatively, radio communication service complying with other types of radio communication schemes such as wireless local area network (wireless LAN) may be provided.

The small cell base station 10 is connected to the macro cell base station 20 via a back haul link (thick arrow in the drawing). The back haul link may be a wired link or a radio link. The macro cell base station 20 is connected to a core network 5. The core network 5 includes a plurality of control nodes which respectively have roles such as management of user information, management of mobility of terminals, transferring of packets and a role as a gateway, or the like. The small cell base station 10 may be also connected to the core network 5. It should be noted that the small cell base station 10 may be connected to the core network 5 and the macro cell base station 20 via the Internet 7.

In some embodiments, the small cell base station 10 can operate in at least two operation modes of an active mode and a standby mode. In the present specification, the active mode is a mode in which the small cell base station 10 at least transmits a signal for causing the terminal to recognize the small cell 18. The signal for causing the terminal to recognize the small cell 18 can include, for example, a reference signal (also referred to as a beacon signal, a pilot signal or a synchronization signal) on a downlink channel. In the active mode, the small cell base station 10 continuously supplies power to hardware of the own apparatus including a radio communication circuit and a control circuit. The standby mode is a mode in which the small cell base station 10 at least does not transmit the above-described signal for causing the terminal to recognize the small cell 18. In the standby mode, the small cell base station 10 intermittently supplies power to, for example, the radio communication circuit, or does not supply power to the radio communication circuit or the control circuit. The concept of the standby mode can include an idle mode, a sleep mode and a dormant mode. It should be noted that the small cell base station 10 may be further able to operate in an operation mode different from the active mode and the standby mode.

In the example of FIG. 1, the small cell base station 10a operates in the active mode. Inside the small cell 18a, received power or reception quality measured for a reference signal transmitted from the small cell base station 10a is more favorable than received power or reception quality measured for a reference signal transmitted from the macro cell base station 20. Therefore, the terminal apparatus 30a can be connected to the small cell base station 10a to implement radio communication at a higher data rate. Meanwhile, the operation mode of the small cell base station 10b is the standby mode. The small cell base station 10b does not transmit a reference signal. In this situation, it is assumed that the terminal apparatus 30b moves from a point P1 to a point P2 which is inside the small cell 18b. However, because a reference signal is not transmitted from the small cell base station 10b, even if the terminal apparatus 30b executes cell search or measurement, information of the small cell 18b is not included in the result. Accordingly, the terminal apparatus 30b can continue to be connected to the macro cell base station 20 although the terminal apparatus 30b is located in the vicinity of the small cell base station 10b.

To promote utilization of small cells, there is also a possible solution that even when the small cell base station 10b is put into the standby state, the small cell base station 10b periodically transmits a reference signal. Further, there is also a possible solution that the terminal apparatus 30 periodically transmits an activation request to base stations around the terminal apparatus 30. However, when a radio signal is randomly transmitted although feasibility of connection is unknown, interference within the macro cell 28 increases and overall capacity of the system is rather reduced. Further, periodic transmission of a signal degrades power consumption.

The above-described Patent Literature 1 discloses a solution using a GPS to address such problems. In the method disclosed in the above-described Patent Literature 1, the macro cell base station calculates a distance between the small cell base station and the terminal based on location data of the terminal positioned using the GPS, and determines the presence of a terminal located in the vicinity of the small cell base station using the calculation result. However, given an example such as a pico cell whose cell radius is only several meters, positioning accuracy of the GPS is not sufficiently high compared to the size of the small cell. Further, the terminal cannot always receive a GPS signal or output location data indoors where the small cell is often disposed. Therefore, it is difficult to say that the solution using the GPS practically solves the above-mentioned problems regarding recognition of a small cell which is put into the standby state.

Accordingly, in some embodiments which will be described later, the small cell base station 10 detects a terminal existing in the vicinity by monitoring strength of an uplink signal transmitted in the macro cell 28 while the operation mode is set at the standby mode. When the small cell base station 10 detects a terminal existing in the vicinity through monitoring, the small cell base station 10 switches the operation mode to the active mode. By this means, it becomes possible to provide an opportunity for handover to a small cell base station to a terminal approaching the small cell base station which is put into the standby state without fruitlessly increasing interference within the macro cell 28. Two exemplary embodiments for realizing such a mechanism will be described in detail in the following section.

2. First Embodiment

[2-1. Configuration Example of Small Cell Base Station]

Figure 2:
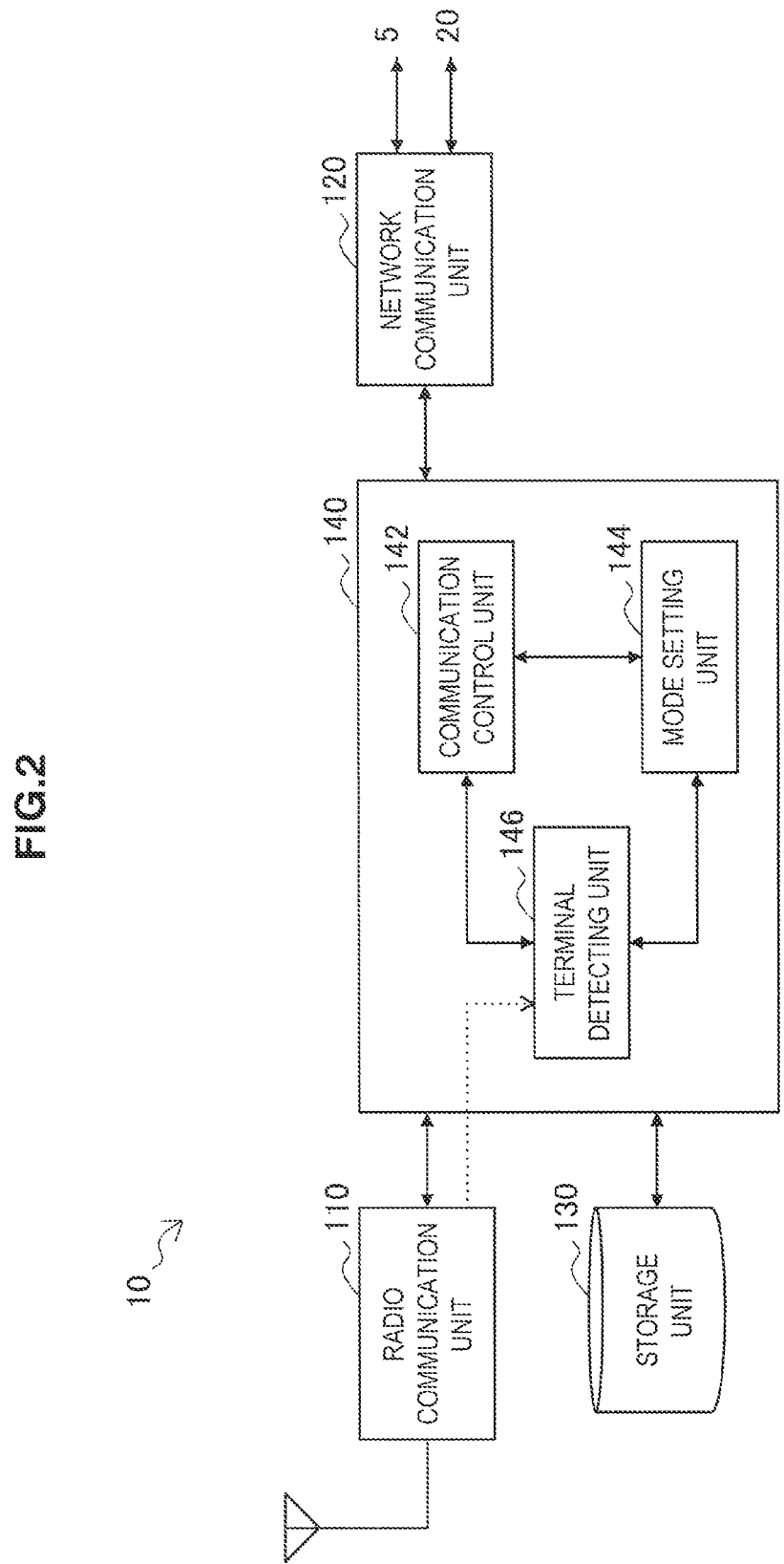
FIG. 2 is a block diagram illustrating one example of a configuration of a small cell base station according to a first embodiment.

FIG. 2 is a block diagram illustrating one example of a configuration of a small cell base station 10 according to a first embodiment. Referring to FIG. 2, the small cell base station 10 includes a radio communication unit 110, a network communication unit 120, a storage unit 130 and a control unit 140.

(1) Radio Communication Unit

The radio communication unit 110 provides radio communication service to one or more terminal apparatuses 30 located within the small cell 18 which overlaps with the macro cell 28. For example, the radio communication unit 110 transmits a reference signal on a downlink channel in the active mode. By receiving this reference signal, the terminal apparatus 30 can be connected to the small cell 18. The terminal apparatus 30 derives communication quality of the small cell 18 by executing measurement for the reference signal transmitted from the radio communication unit 110.

(2) Network Communication Unit

The network communication unit 120 establishes a back haul link with the macro cell base station 20 and mediates communication between the small cell base station 10 and the macro cell base station 20. The back haul link is also utilized in communication between the small cell base station 10 and other small cell base stations.

(3) Storage Unit

The storage unit 130 stores a program and data for operation of the small cell base station 10 using a storage medium such as a hard disk and a semiconductor memory. The data stored in the storage unit 130 can include, for example, resource configuration data which will be described later, acquired from an external apparatus.

(4) Control Unit

The control unit 140 controls general operation of the small cell base station 10 using a processor such as a central processing unit (CPU) and a digital signal processor (DSP). In the present embodiment, the control unit 140 includes a communication control unit 142, a mode setting unit 144 and a terminal detecting unit 146.

The communication control unit 142 controls provision of the radio communication service by the small cell base station 10. For example, the communication control unit 142 makes the network communication unit 120 transfer uplink data traffic received by the radio communication unit 110 to the macro cell base station 20 depending on its address. Further, the communication control unit 142 makes the radio communication unit 110 transmit downlink data traffic received from other nodes by the network communication unit 120 to the terminal apparatus 30 to which the downlink data traffic is addressed. Further, when the communication control unit 142 receives a request for handover to the small cell base station 10 itself as a target base station from the macro cell base station 20, the communication control unit 142 makes the radio communication unit 110 establish connection with the terminal apparatus 30 after procedure of admission control and random access from the terminal apparatus 30. Further, the communication control unit 142 suppresses interference to be provided to nodes around the small cell base station 10 by controlling transmission power of a radio signal transmitted at the small cell 18.

The mode setting unit 144 sets an operation mode which can be selected from a set of operation modes which can include the active mode and the standby mode to the radio communication unit 110. For example, when the number of terminal apparatuses 30 connected to the radio communication unit 110 becomes zero, the mode setting unit 144 switches the operation mode of the radio communication unit 110 from the active mode to the standby mode. Further, when the terminal detecting unit 146 detects a terminal existing in the vicinity while the operation mode is set at the standby mode, the mode setting unit 144 switches the operation mode of the radio communication unit 110 to the active mode.

The terminal detecting unit 146 detects a terminal existing in the vicinity by monitoring strength of the uplink signal to be transmitted in the macro cell 28 while the operation mode of the radio communication unit 110 is set at the standby mode. More specifically, the terminal detecting unit 146 acquires resource configuration data of the macro cell 28 from the macro cell base station 20 (or an external apparatus which is an upper node of the macro cell base station 20). Then, the terminal detecting unit 146 identifies uplink resource to be monitored based on the acquired resource configuration data. The resource configuration data described here can include operation frequency band information for each link direction when the macro cell 28 is operated using the frequency division duplex (FDD) scheme. On the other hand, when the macro cell 28 is operated using the time division duplex (TDD) scheme, the resource configuration data can include UL-DL configuration information. The UL-DL configuration information can indicate, for example, for each of a plurality of sub-frames (in the LTE scheme, 10 sub-frames) constituting a radio frame, whether the sub-frame is an uplink sub-frame or a downlink sub-frame (or a special sub-frame). The terminal detecting unit 146 then continuously measures received signal strength on the uplink resource identified based on the resource configuration data and compares the measured received signal strength with a determination threshold for terminal detection. The received signal strength can be typically measured without demodulating and decoding a received signal. An uplink signal contributing to the received signal strength can include both a control signal and a data signal. The measured received signal strength indicates a higher value when more pieces of uplink data are transmitted from the terminal in the vicinity. It should be noted that the terminal detecting unit 146 may measure the received signal strength while scanning the whole of channels which can receive the signal without being based on the resource configuration data. It should be noted that here, measurement of signal strength by the terminal detecting unit 146 may include arbitrary operation such as direct arithmetic average and moving average of measurement values.

The determination threshold for terminal detection may be a fixed value (such as, for example, −50 dBM) defined in advance. Alternatively, the determination threshold for terminal detection may be set larger when a distance between the macro cell base station 20 and the radio communication unit 110 is larger. Typically, the terminal apparatus located farther from the macro cell base station 20 transmits an uplink signal with greater power. On the other hand, in most cases, the cell size of the small cell 18 does not depend on the distance between the macro cell base station 20 and the radio communication unit 110. Therefore, by setting the determination threshold larger when the distance from the macro cell base station 20 is larger, it is also possible to prevent the terminal detecting unit 146 from erroneously detecting a terminal which is not located sufficiently in the vicinity of the small cell base station 10 near a cell edge of the macro cell 28 as a result of strength of the uplink signal being too high. Further, it is also possible to prevent a terminal located sufficiently in the vicinity of the small cell base station 10 from not being detected by the terminal detecting unit 146 as a result of strength of the uplink signal being too weak. Dynamic setting of the determination threshold may be autonomously performed by the terminal detecting unit 146 or may be performed in response to an instruction from an external apparatus.

The terminal detecting unit 146 may dynamically set the determination threshold for terminal detection based on strength of the downlink signal (for example, the reference signal) received from the macro cell base station 20. Normally, the strength of the downlink signal received from the macro cell base station 20 becomes smaller when a distance between the macro cell base station 20 and the radio communication unit 110 is larger. Therefore, with relatively simple implementation of setting the determination threshold larger when the strength of the downlink signal from the macro cell base station 20 (for example, received signal strength (RSSI) or reference signal received power (RSRP)) is smaller, it is possible to prevent a terminal which does not exist in the vicinity from being erroneously detected or a terminal which should be detected from not being detected.

When the received signal strength measured on the uplink resource exceeds the determination threshold, the terminal detecting unit 146 typically determines that the terminal apparatus 30 exists in the vicinity of the small cell base station 10. According to this threshold determination method, even if a terminal actually exists in the vicinity of the small cell base station 10, if the terminal does not transmit an uplink signal, the terminal detecting unit 146 does not detect the terminal. Because the terminal which transmits neither an uplink data signal nor a control signal (for example, acknowledgement to the downlink data signal) does not affect system capacity although the terminal is accommodated in the small cell base station 10, the above-described threshold determination method is rational.

When the received signal strength continuously exceeds the determination threshold over a predetermined time length which can be measured using a timer, the terminal detecting unit 146 may determine that a terminal exists in the vicinity of the small cell base station 10. According to this configuration, for example, it is possible to avoid the small cell base station 10 from being activated due to a terminal which only temporarily stays in the small cell 18 (passes through the small cell 18 in a short period). Further, it is also possible to avoid the small cell base station 10 from being activated due to one-time action such as downloading of electronic mail data by the terminal.

When the terminal detecting unit 146 can read a terminal ID included in the uplink signal, the terminal detecting unit 146 may change the determination threshold depending on the read terminal ID. For example, when a terminal ID of a user who frequently stays in the small cell 18 is read, by setting the determination threshold lower, it is possible to promptly provide radio communication service of the small cell to the user.

The terminal detecting unit 146 may determine that a terminal exists in the vicinity of the small cell base station 10 when the measurement result of the received signal strength matches a predetermined pattern. The predetermined pattern can correspond to, for example, some kind of periodicity or continuity or a combination of these. According to this configuration, for example, it is possible to detect a terminal which continues to receive downlink data over a certain period by acquiring acknowledgement (ACK) and negative acknowledgement (NACK) to the downlink data.

The terminal detecting unit 146 continuously executes the above-described monitoring of the strength of the uplink signal while the operation mode of the radio communication unit 110 is set at the standby mode. The mode setting unit 144 then switches the operation mode of the radio communication unit 110 to the active mode when the terminal detecting unit 146 detects a terminal existing in the vicinity. Further, the mode setting unit 144 transmits a message for signaling switching of the operation mode to the active mode to the macro cell base station 20 via the back haul link. When the small cell base station 10 is located near the cell edge of the macro cell 28, the mode setting unit 144 may signal switching to the active mode to the macro cell base stations 20 of a plurality of macro cells adjacent to each other across the cell edge. As will be described later, the macro cell base station 20 instructs at least one terminal connected to the macro cell base station 20 to perform measurement in response to reception of the message. As a result, at the terminal actually located in the vicinity of the small cell base station 10, communication quality which is higher than that of the reference signal of the macro cell 28 is measured for the small cell 18, and handover from the macro cell 28 to the small cell 18 by the terminal can be executed. It should be noted that the mode setting unit 144 may signal switching of the operation mode to the active mode to an external apparatus which is an upper node of the macro cell base station 20.

The mode setting unit 144 may switch the operation mode to the standby mode when no terminal is connected to the small cell 18 until a certain timing after the operation mode is switched to the active mode (for example, handover is not requested). The certain timing described here may be, for example, a timing at which a predetermined time length has elapsed from an arbitrary time point such as detection of a terminal in the vicinity, signaling to the macro cell base station 20 and switching to the active mode. Further, the mode setting unit 144 may switch the operation mode to the standby mode when the mode setting unit 144 is notified from an external apparatus that handover is not executed in response to signaling of switching to the active mode. For example, when the macro cell base station 20 determines that handover to the small cell 18 should not be executed as a result of handover determination based on a measurement report from the terminal, the macro cell base station 20 can notify the small cell base station 10 that handover is not executed. In any case, by promptly returning the operation mode to the standby mode under conditions where a terminal actually connected to the small cell 18 does not exist, it is possible to stop fruitless transmission of a reference signal of downlink. By this means, it is possible to suppress occurrence of interference within the macro cell 28 and reduce power consumption of the small cell base station 10.

Figure 3A:
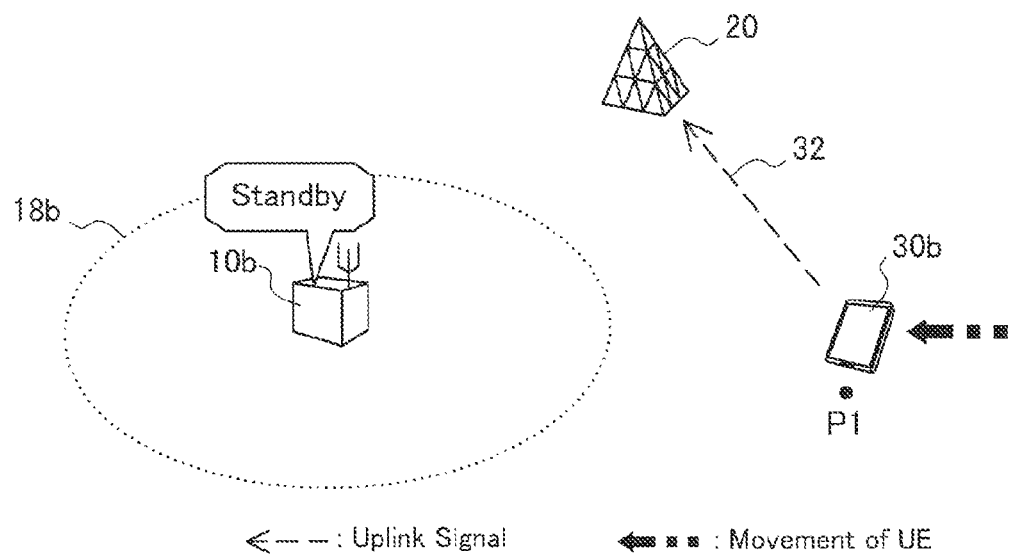
FIG. 3A is a first explanatory diagram for explaining basic principle of communication control processing according to the first embodiment.

FIG. 3A to FIG. 3D are explanatory diagrams for explaining basic principle of communication control processing according to the present embodiment. Referring to FIG. 3A, the small cell base station 10b, the macro cell base station 20 and the terminal apparatus 30b are illustrated. The small cell base station 10b is set at the standby mode. The terminal apparatus 30b is located at the point P1. The point P1 is outside a range of the small cell 18b operated by the small cell base station 10b. In this case, an uplink signal 32 transmitted from the terminal apparatus 30b to the macro cell base station 20 is received by the small cell base station 10b at a level lower than the determination threshold or not received.

Figure 3B:
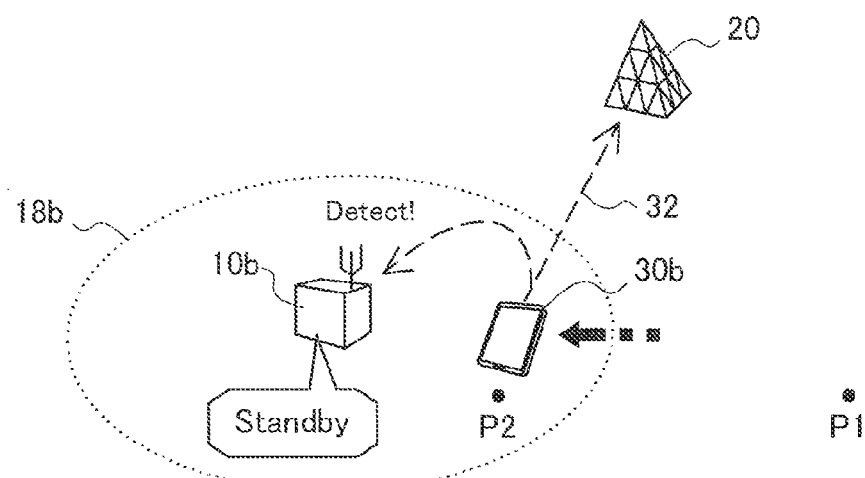
FIG. 3B is a first explanatory diagram for explaining basic principle of communication control processing according to the first embodiment.

In FIG. 3B, the terminal apparatus 30b moves from the point P1 to the point P2. The point P2 is located inside the small cell 18b. In this case, the uplink signal 32 transmitted from the terminal apparatus 30b to the macro cell base station 20 is received at a level higher than the determination threshold by the small cell base station 10b. The small cell base station 10b which monitors the uplink resource of the macro cell 28 also while the operation mode is set at the standby mode, recognizes that the received signal strength exceeds the determination threshold due to the uplink signal 32. As a result, the small cell base station 10b detects that the terminal apparatus 30b exists in the vicinity.

Figure 3C:
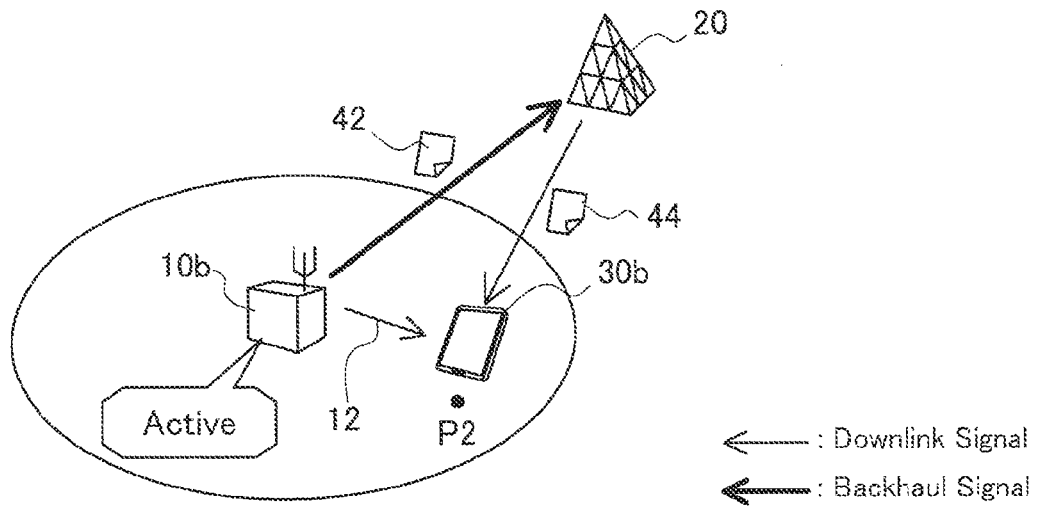
FIG. 3C is a first explanatory diagram for explaining basic principle of communication control processing according to the first embodiment.

In FIG. 3C, the operation mode of the small cell base station 10b which detects that the terminal apparatus 30b exists, transitions to the active mode. The small cell base station 10b starts transmission of the reference signal 12 of downlink. Further, the small cell base station 10b transmits a terminal detection message 42 to the macro cell base station 20 on the back haul link. The terminal detection message 42 can indicate that a terminal existing in the vicinity of the small cell base station 10b is detected, and that the small cell base station 10b is activated. The macro cell base station 20 transmits a measurement instruction message 44 to the terminal apparatus 30b (and other terminals).

Figure 3D:
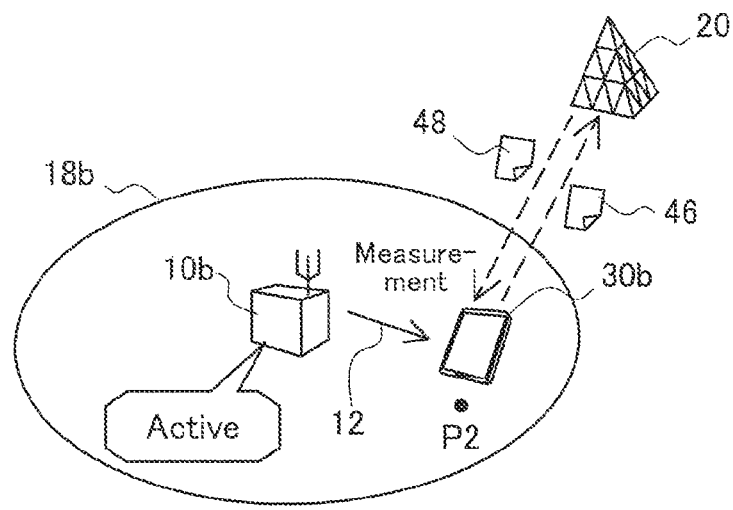
FIG. 3D is a first explanatory diagram for explaining basic principle of communication control processing according to the first embodiment.

In FIG. 3D, the terminal apparatus 30b executes measurement in response to an instruction from the macro cell base station 20. During measurement procedure, the terminal apparatus 30b measures a quality index such as RSRP and RSRQ for the reference signal 12 from the small cell base station 10b. The terminal apparatus 30b then transmits a measurement report 46 indicating the measurement result to the macro cell base station 20. When the measurement report 46 indicates that communication quality of the small cell 18b is more favorable than that of the macro cell 28, the macro cell base station 20 transmits a handover instruction message for handover to the small cell base station 10b as a target base station to the terminal apparatus 30b.

[2-2. Configuration Example of Macro Cell Base Station]

Figure 4:
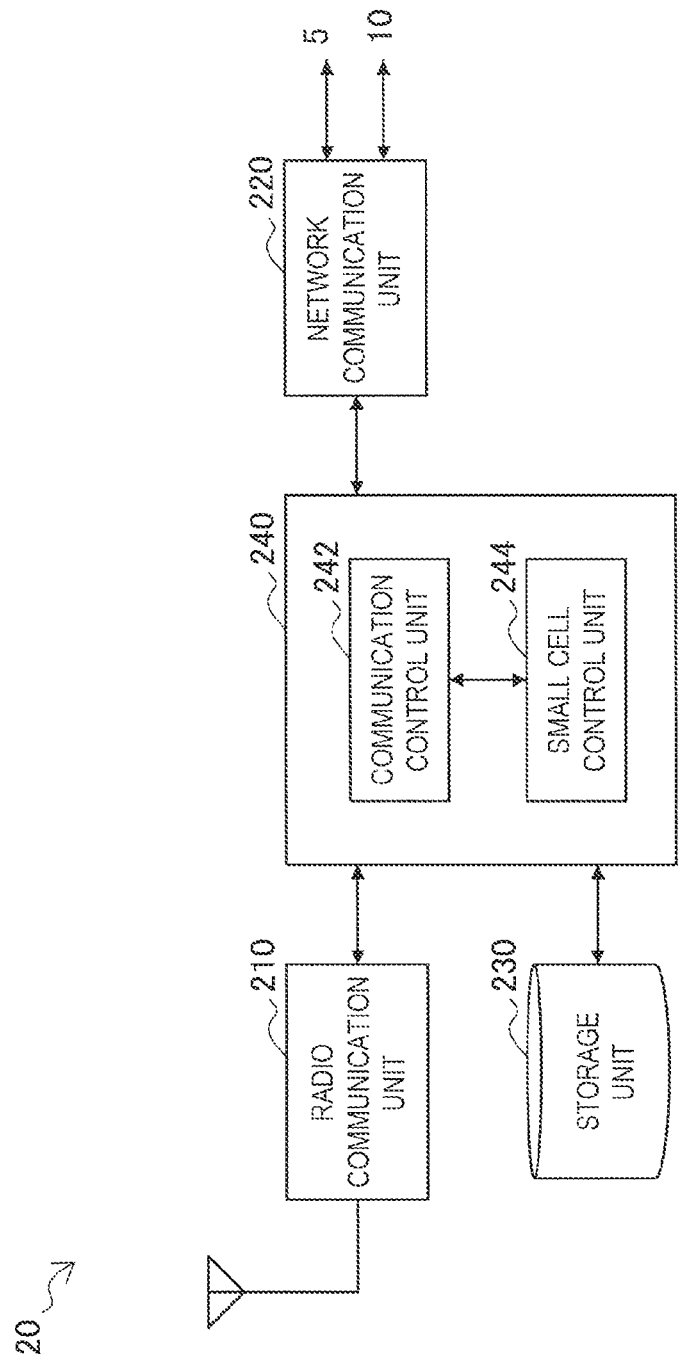
FIG. 4 is a block diagram illustrating one example of a configuration of a macro cell base station according to the first embodiment.

FIG. 4 is a block diagram illustrating one example of a configuration of the macro cell base station 20 according to the first embodiment. Referring to FIG. 4, the macro cell base station 20 includes a radio communication unit 210, a network communication unit 220, a storage unit 230 and a control unit 240. It should be noted that it is assumed that the macro cell base station 20 operates according to the LTE scheme as one example, but not by way of limitation.

(1) Radio Communication Unit

The radio communication unit 210 provides radio communication service to the terminal apparatus 30 located within the macro cell 28. For example, the radio communication unit 210 transmits a primary synchronization sequence and a secondary synchronization sequence on a downlink channel. A pattern of the synchronization sequences corresponds to any of a plurality of cell Identities (cell IDs). By receiving these synchronization sequences, the small cell base station 10 and the terminal apparatus 30 achieve synchronization with the macro cell 28 and can identify the macro cell 28. Further, the radio communication unit 210 transmits a cell-specific reference signal (CRS) called a pilot signal following the synchronization sequences. The terminal apparatus 30 derives communication quality of the macro cell 28 by executing measurement for the reference signal transmitted from the radio communication unit 210. When synchronization sequences from a plurality of macro cells are detected, the terminal apparatus 30 can select a cell exhibiting the most favorable communication quality as an optimal serving cell through procedure called cell selection.

(2) Network Communication Unit

The network communication unit 220 mediates communication among the macro cell base station 20, a control node within a core network 5, another macro cell base station and the small cell base station 10. For example, the network communication unit 220 establishes communication links respectively called an S1-U interface and an S1-MME interface between a serving-gateway (S-SG) and mobility management entity (MME) within the core network 5. Further, the network communication unit 220 also establishes a communication link called an X2 interface with other base stations. The X2 interface can be also utilized as the above-described back haul link.

(3) Storage Unit

The storage unit 230 stores a program and data for operation of the macro cell base station 20 using a storage medium such as a hard disk and a semiconductor memory. The data stored by the storage unit 230 can include, for example, resource configuration data to be distributed to the small cell base station 10. Further, the data stored by the storage unit 230 can include identification information for each small cell base station 10 and cell data indicating a current operation mode.

(4) Control Unit

The control unit 240 controls general operation of the macro cell base station 20 using a processor such as a CPU and a DSP. In the present embodiment, the control unit 240 includes a communication control unit 242 and a small cell control unit 244.

The communication control unit 242 controls provision of the radio communication service by the macro cell base station 20. For example, the communication control unit 242 makes the network communication unit 220 transfer uplink data traffic received by the radio communication unit 210 to the core network 5 or other macro cell base stations or the small cell base station 10 depending on its address. Further, the communication control unit 242 makes the radio communication unit 210 transmit downlink data traffic received by the network communication unit 220 from other nodes to the terminal apparatus 30 to which the downlink data traffic is addressed. Further, the communication control unit 242 executes handover determination based on communication quality of the macro cell 28 (which is a serving cell) and other cells indicated by the measurement report. When, for example, communication quality of the small cell 18 is more favorable than communication quality of the macro cell 28, the communication control unit 242 transmits a handover request to the small cell base station 10 which operates the small cell 18 and further transmits a handover instruction to the terminal apparatus 30.

The small cell control unit 244 controls operation of the small cell base station 10 operating the small cell 18 which overlaps with the macro cell 28. For example, the small cell control unit 244 makes the radio communication unit 210 transmit a measurement instruction message to at least one terminal apparatus 30 connected to the macro cell 28 in response to reception of the terminal detection message by the network communication unit 220 from the small cell base station 10. As described above, the terminal detection message can indicate that a terminal existing in the vicinity of the small cell base station 10 is detected while the small cell base station 10 is set at the standby mode. The terminal detection message may further indicate that the small cell base station 10 is activated (in this meaning, the terminal detection message may be referred to as an activation notification message).

The measurement instruction message may be broadcasted within the macro cell 28 or may be multicasted to a plurality of terminal apparatuses 30. Alternatively, the measurement instruction message may be unicasted to individual terminal apparatuses 30. The measurement instruction message may be selectively transmitted to only part of the terminal apparatuses 30 located near the small cell base station 10 which is a transmission source of the terminal detection message among the plurality of terminal apparatuses 30 existing within the macro cell 28. The terminal apparatus 30 executes measurement in response to reception of the measurement instruction message and transmits a measurement report to the macro cell base station 20.

As a result of the handover determination by the communication control unit 242, when it is determined that no terminal apparatus 30 should perform handover to the small base station 10, the small cell control unit 244 may notify the small cell base station 10 that handover is not executed. By this means, the small cell base station 10 can promptly return the operation mode to the standby mode and stop fruitless transmission of a reference signal from the small cell base station 10.

The small cell control unit 244 may provide the determination threshold for terminal detection to be used by the small cell base station 10 to the small cell base station 10. As described above, the determination threshold for terminal detection may be a fixed value defined in advance or a value dynamically set depending on a parameter such as a distance between base stations. Further, the small cell control unit 244 may transmit the resource configuration data for identifying uplink resource to be monitored by the small cell base station 10 to the small cell base station 10 via the network communication unit 220.

It should be noted that in one modified example, measurement instruction to the terminal by the small cell base station 10 and reception of the measurement report from the terminal may be omitted. In this case, the small cell control unit 244 can instruct at least one terminal apparatus 30 connected to the macro cell 28 to perform handover to the small cell base station 10 which is a transmission source of the terminal detection message in response to reception of the terminal detection message from the small cell base station 10.

Further, here, an example where individual small cells 18 and macro cells 28 are respectively operated by different base station apparatuses has been mainly described. However, the technique according to the present disclosure can be also applied to an example where a plurality of cells are operated by a single base station apparatus. For example, it is possible for a single base station apparatus to operate two or more small cells having difference cell IDs using a plurality of antennas. In this case, the operation mode of each small cell can be separately set depending on whether a terminal exists in the vicinity of each small cell.

[2-3. Processing Flow]
(1) Terminal Detection Processing

Figure 5:
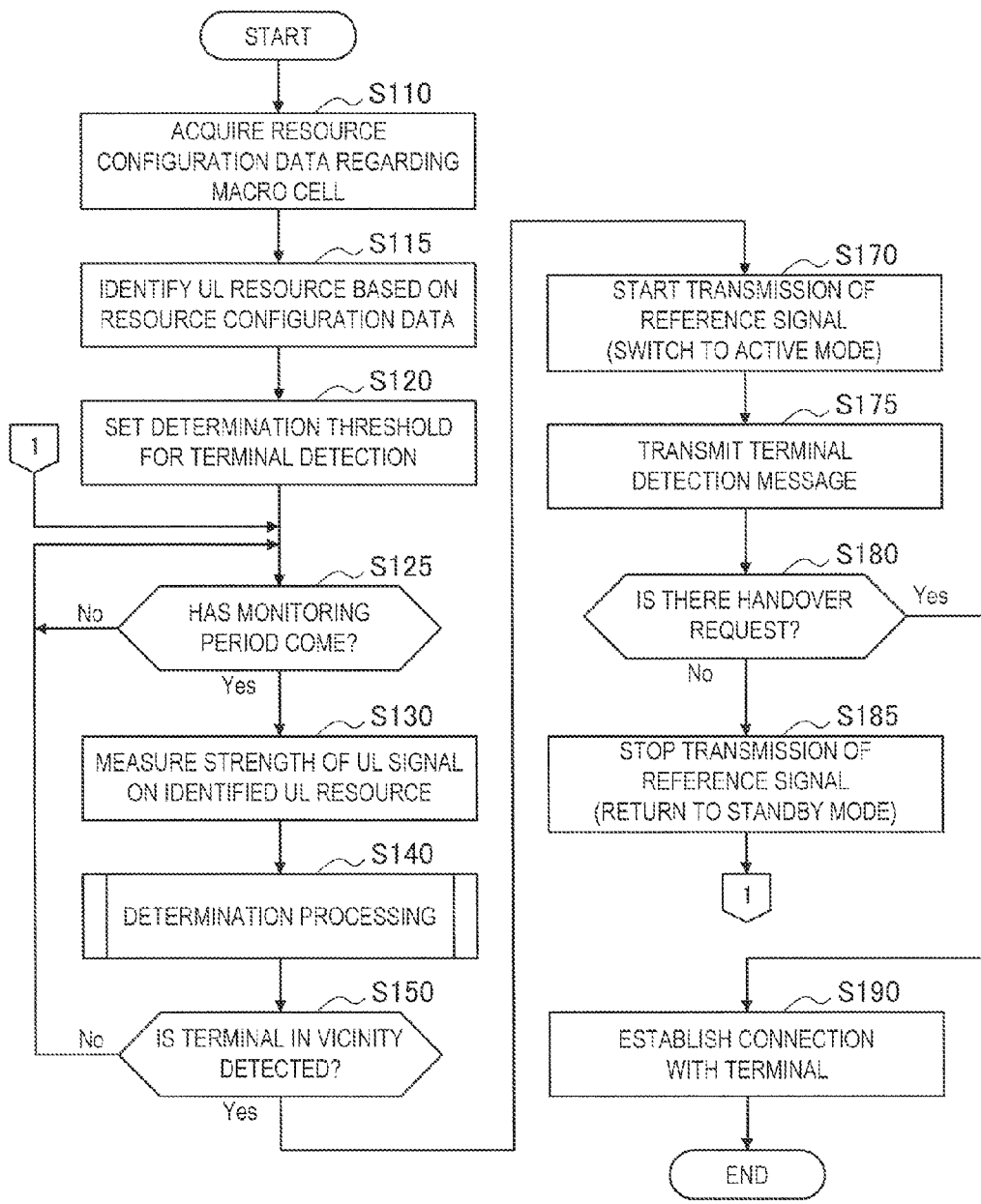
FIG. 5 is a flowchart illustrating one example of flow of terminal detection processing executed by the small cell base station according to the first embodiment.

FIG. 5 is a flowchart illustrating one example of flow of terminal detection processing executed by the small cell base station 10 according to the first embodiment. The terminal detection processing illustrated in FIG. 5 is started when the operation mode of the small cell base station 10 is set at the standby mode.

Referring to FIG. 5, first, the terminal detecting unit 146 acquires resource configuration data for the macro cell 28 from an external apparatus (step S110). Subsequently, the terminal detecting unit 146 identifies uplink resource to be monitored based on the acquired resource configuration data (step S115). The terminal detecting unit 146 then sets a determination threshold for terminal detection (step S120).

Subsequently, the terminal detecting unit 146 waits for coming of a monitoring period (step S125). When the monitoring period comes, the terminal detecting unit 146 measures received signal strength on the uplink resource identified based on the resource configuration data (step S130). The terminal detecting unit 146 then detects a terminal existing in the vicinity of the small cell base station 10 by executing determination processing based on the measured received signal strength (step S140). Some examples of more detailed flow of the determination processing executed here will be further described later.

When a terminal in the vicinity is not detected in step S140, the processing returns to step S125 (step S150). When a terminal in the vicinity is detected by the terminal detecting unit 146, the mode setting unit 144 switches the operation mode of the radio communication unit 110 to the active mode, and makes the radio communication unit 110 start transmission of a reference signal (step S170). Further, the mode setting unit 144 transmits a terminal detection message for signaling switching of the operation mode to the active mode to the macro cell base station 20 (step S175).

Then, the communication control unit 142 waits for reception of a handover request (step S180). When a handover request is not received until a certain timing after the operation mode switches to the active mode, the mode setting unit 144 makes the radio communication unit 110 stop transmission of a reference signal, and returns the operation mode of the radio communication unit 110 to the standby mode (step S185). Also when the mode setting unit 144 is notified from an external apparatus that handover is not executed, the mode setting unit 144 may return the operation mode to the standby mode. Then, the processing returns to step S125.

On the other hand, when a handover request for handover to the small cell base station 10 itself as a target base station, the mode setting unit 144 maintains the active mode, and connection between the radio communication unit 110 and the terminal apparatus 30 is established through handover procedure (step S190).

(2) Threshold Setting Processing

Figure 6:
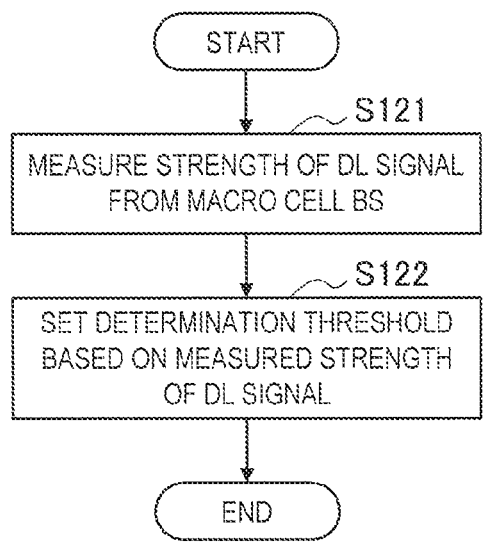
FIG. 6 is a flowchart illustrating one example of detailed flow of threshold setting processing.

FIG. 6 is a flowchart illustrating one example of detailed flow of threshold setting processing corresponding to step S120 in FIG. 5. Here, an example will be described where the determination threshold for terminal detection is dynamically set based on strength of a signal received from the macro cell base station 20.

Referring to FIG. 6, the terminal detecting unit 146 measures strength of a downlink signal (for example, a reference signal) received by the radio communication unit 110 from the macro cell base station 20 (step S121). The terminal detecting unit 146 then dynamically sets the determination threshold for terminal detection based on the measured strength of the downlink signal (step S122). For example, the terminal detecting unit 146 can set the determination threshold larger when the measurement result of signal strength is smaller.

(3) Determination Processing

Figure 7A:
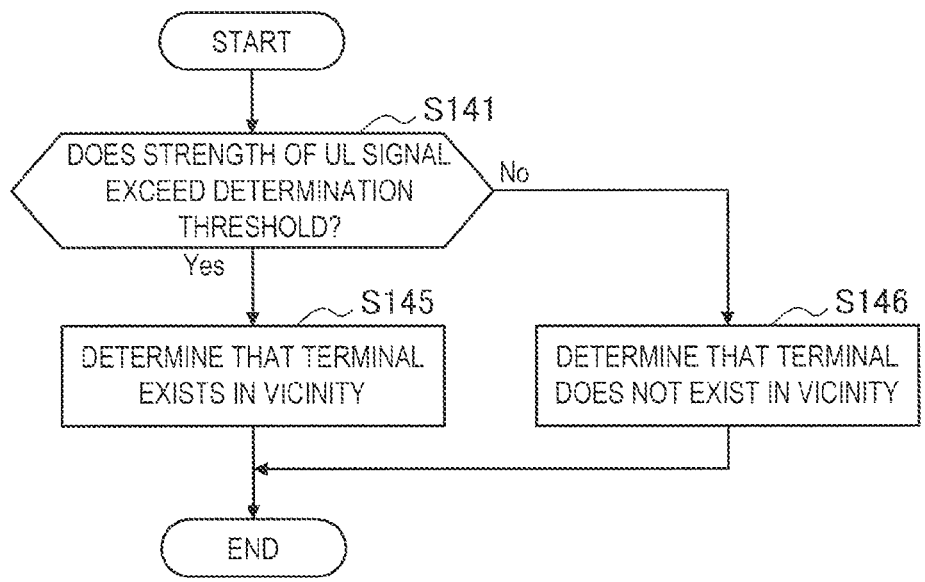
FIG. 7A is a flowchart illustrating a first example of detailed flow of determination processing.

FIG. 7A is a flowchart illustrating a first example of detailed flow of determination processing corresponding to step S140 in FIG. 5. Referring to FIG. 7, the terminal detecting unit 146 determines whether the measured strength of the uplink signal exceeds the determination threshold (step S141). When the strength of the uplink signal exceeds the determination threshold, the terminal detecting unit 146 determines that the terminal apparatus 30 exists in the vicinity of the small cell base station 10 (step S145). On the other hand, when the strength of the uplink signal does not exceed the determination threshold, the terminal detecting unit 146 determines that the terminal apparatus 30 does not exist in the vicinity of the small cell base station 10 (step S146).

Figure 7B:
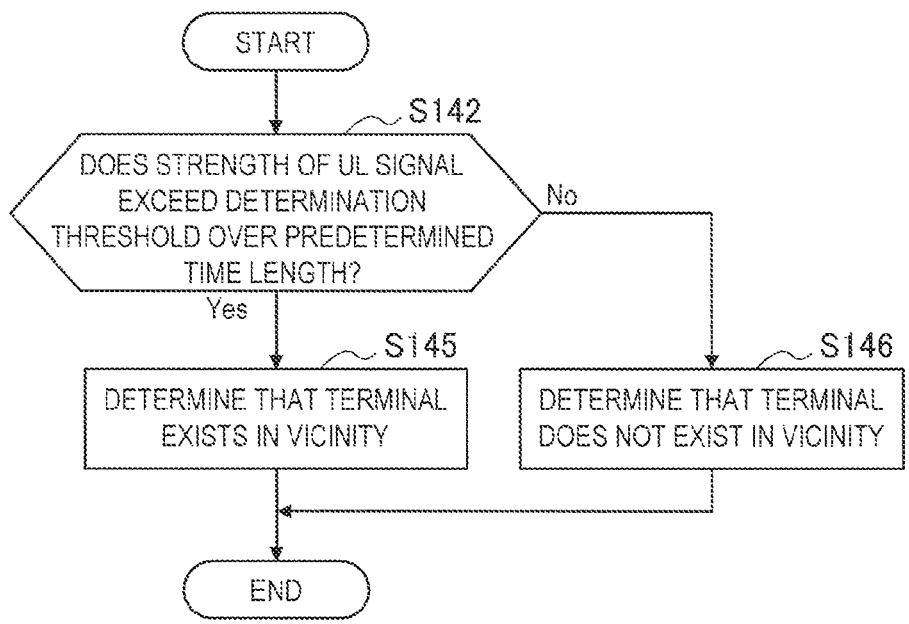
FIG. 7B is a flowchart illustrating a second example of detailed flow of determination processing.

FIG. 7B is a flowchart illustrating a second example of detailed flow of determination processing corresponding to step S140 in FIG. 5. Referring to FIG. 7B, the terminal detecting unit 146 determines whether the measured strength of the uplink signal continuously exceeds the determination threshold over a predetermined time length (step S142). When the strength of the uplink signal exceeds the determination threshold over the predetermined time length, the terminal detecting unit 146 determines that the terminal apparatus 30 exists in the vicinity of the small cell base station 10 (step S145). Otherwise, the terminal detecting unit 146 determines that the terminal apparatus 30 does not exist in the vicinity of the small cell base station 10 (step S146).

Figure 7C:
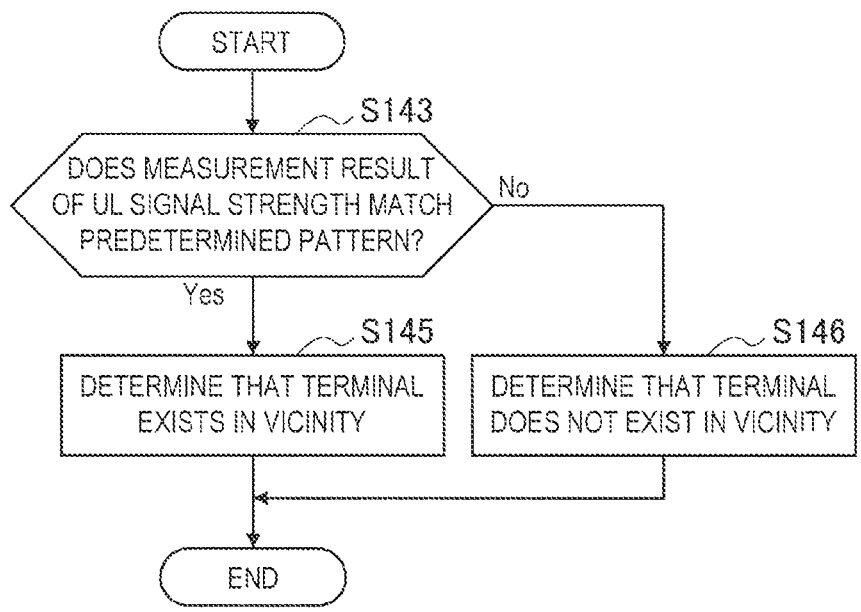
FIG. 7C is a flowchart illustrating a third example of detailed flow of determination processing.

FIG. 7C is a flowchart illustrating a third example of detailed flow of determination processing corresponding to step S140 in FIG. 5. Referring to FIG. 7C, the terminal detecting unit 146 determines whether the measurement result of the measured strength of the uplink signal (over a certain time window) matches a predetermined pattern (step S143). When the measurement result matches the predetermined pattern, the terminal detecting unit 146 determines that the terminal apparatus 30 exists in the vicinity of the small cell base station 10 (step S145). Otherwise, the terminal detecting unit 146 determines that the terminal apparatus 30 does not exist in the vicinity of the small cell base station 10 (step S146).

(4) Small Cell Control Processing

Figure 8:
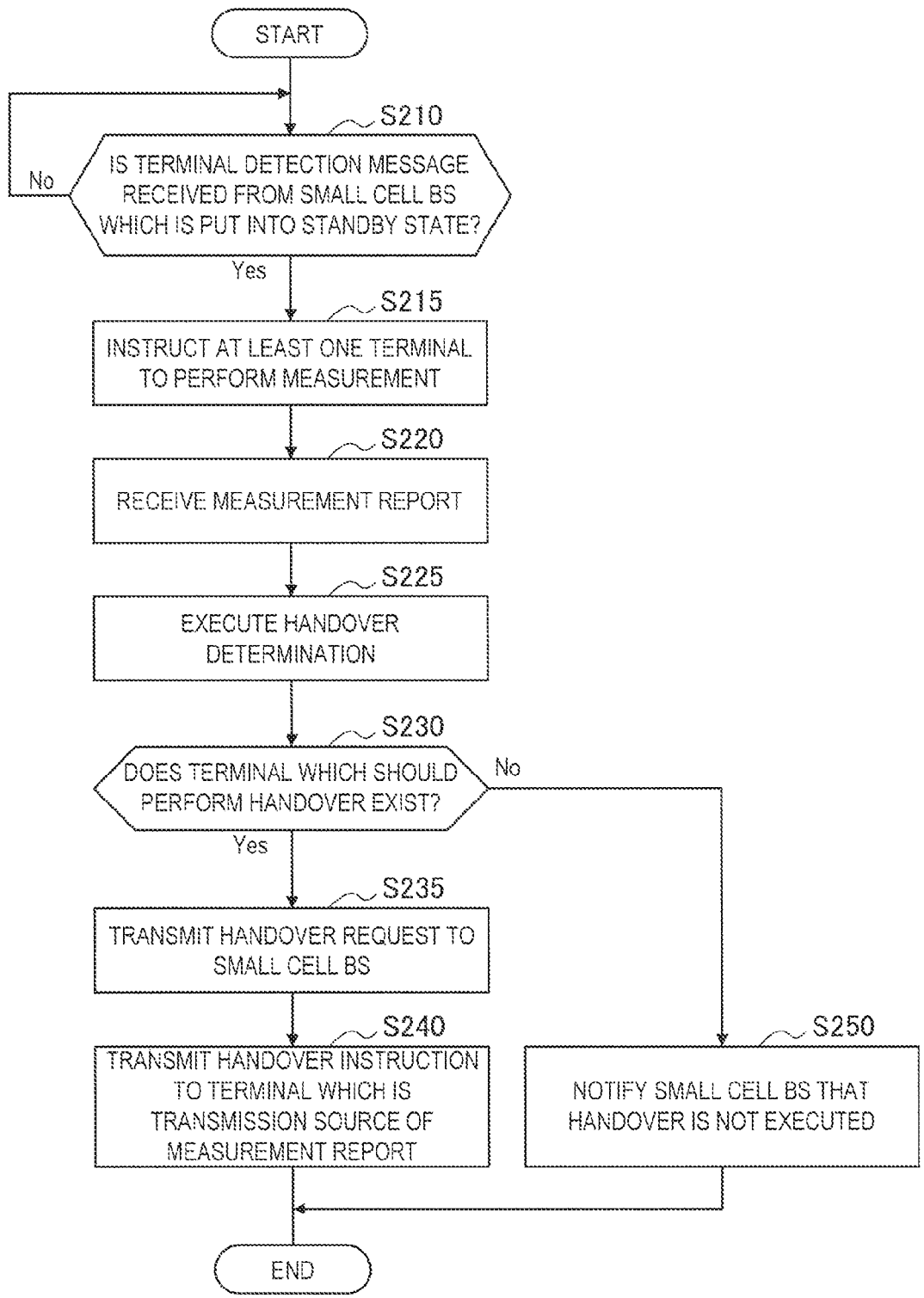
FIG. 8 is a flowchart illustrating one example of flow of small cell control processing executed by the macro cell base station according to the first embodiment.

FIG. 8 is a flowchart illustrating one example of flow of small cell control processing executed by the macro cell base station 20 according to the first embodiment.

Referring to FIG. 8, the small cell control unit 244 waits for reception of the terminal detection message from the small cell base station 10 which is put into the standby state (step S210). When the terminal detection message is received, the small cell control unit 244 transmits a measurement instruction message to at least one terminal apparatus 30 connected to the macro cell 28 (step S215).

Then, the radio communication unit 210 receives a measurement report from the terminal apparatus 30 which receives the measurement instruction message (step S220). The measurement report can be also received from the terminal apparatus 30 which periodically executes measurement regardless of reception of the measurement instruction message. The communication control unit 242 then executes handover determination based on communication quality of the macro cell 28 indicated in the measurement report and other cells (step S225). It should be noted that while it is illustrated in a simplified manner in the drawing, the handover determination can be executed at individual terminal apparatuses 30 every time the measurement report is received.

The communication control unit 242 then determines whether a terminal which should execute handover exists based on the result of the handover determination (step S230). Here, when a terminal which should perform handover exists, the communication control unit 242 transmits a handover request to the small cell base station 10 selected as the target base station (step S235). Subsequently, when handover is approved by the target base station, the communication control unit 242 transmits a handover instruction to the terminal apparatus 30 which is a transmission source of the measurement report (step S240).

On the other hand, when a terminal which should perform handover does not exist as a result of the handover determination, the small cell control unit 244 notifies the small cell base station 10 which is the transmission source of the terminal detection message that handover is not executed (step S250).

3. Second Embodiment

The above-described Patent Literature 1 proposes a scenario of clustering a plurality of small cells disposed at high density, so that small cells within the cluster operate cooperatively with each other. Therefore, in this section, an embodiment in a case where the small cell base station 10 belongs to such a cluster will be described.

[3-1. Outline of System]

Figure 9:
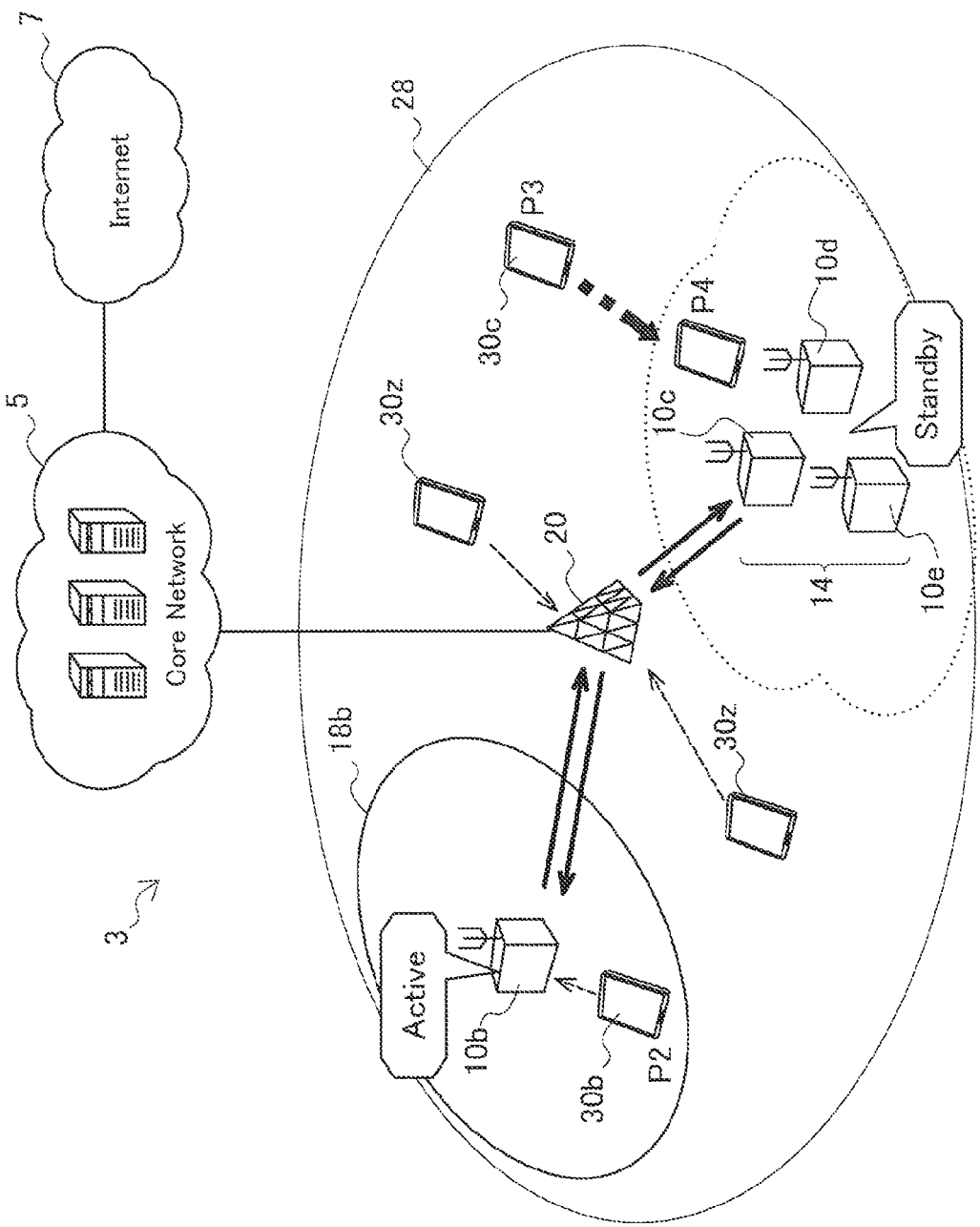
FIG. 9 is an explanatory diagram for explaining outline of a radio communication system according to a second embodiment.

FIG. 9 is an explanatory diagram for explaining outline of a radio communication system according to a second embodiment. Referring to FIG. 9, the radio communication system 3 includes small cell base stations 10b, 10c, 10d and 10e, a macro cell base station 20, and terminal apparatuses 30b, 30c and 30z. It should be noted that the number of macro cell base stations, the number of small cell base stations and the number of terminal apparatuses included in the radio communication system 3 are not limited to the example in FIG. 9.

The small cell base stations 10c, 10d and 10e are small cell base stations belonging to one small cell cluster 14. In the example in FIG. 9, the whole small cell cluster 14 is put into a standby state, that is, all the small cell base stations 10c, 10d and 10e operate in the standby mode. Under such conditions, it is assumed that the terminal apparatus 30c moves from a point P3 to a point P4 in the vicinity of the small cell base station 10c. As described in the first embodiment, the small cell base station 10c monitors strength of an uplink signal transmitted in the macro cell 28 while the operation mode is set at the standby mode. The small cell base station 10c then detects that the terminal apparatus 30c exists in the vicinity. However, in the second embodiment, even when the small cell base station 10c detects presence of the terminal apparatus 30c, the operation mode of the small cell base station 10c does not always transition to the active mode. Instead, the operation mode of any small cell base station 10 within the small cell cluster 14 selected according to some selection criterion transitions to the active mode. The small cell base stations 10d and 10e may both monitor the strength of the uplink signal or may not execute monitoring. Transition of the operation mode of the small cell base station 10 within the small cell cluster 14 may be performed depending on change of traffic load of the macro cell 28 or individual small cells 18 in addition to detection of a terminal in the vicinity.

A plurality of small cell base stations 10 belonging to the same small cell cluster 14 typically operate in synchronization at the same frame timing. Each small cell base station 10 periodically transmits a reference signal in the active mode. Transmission density of the reference signal (and other control signals) from one small cell base station 10 forming a small cell cluster may be set lower than that from the macro cell base station 20 or the small cell base station 10 which independently operates. For example, a plurality of small cell base stations 10 belonging to the same small cell cluster transmit reference signals (if two, alternately) in units of sub-frame in round-robin manner, so that it is possible to suppress interference within the macro cell 28 due to the reference signals. It should be noted that the number of terminals connected to the small cell is smaller than the number of terminals connected to the macro cell, so that it can be assumed that mobility in the small cell is lower than that in the macro cell. Therefore, reduction of density of the reference signals and the control signals transmitted in individual small cells is less likely to negatively affect communication performance

[3-2. Configuration Example of Small Cell Base Station]

Figure 10:
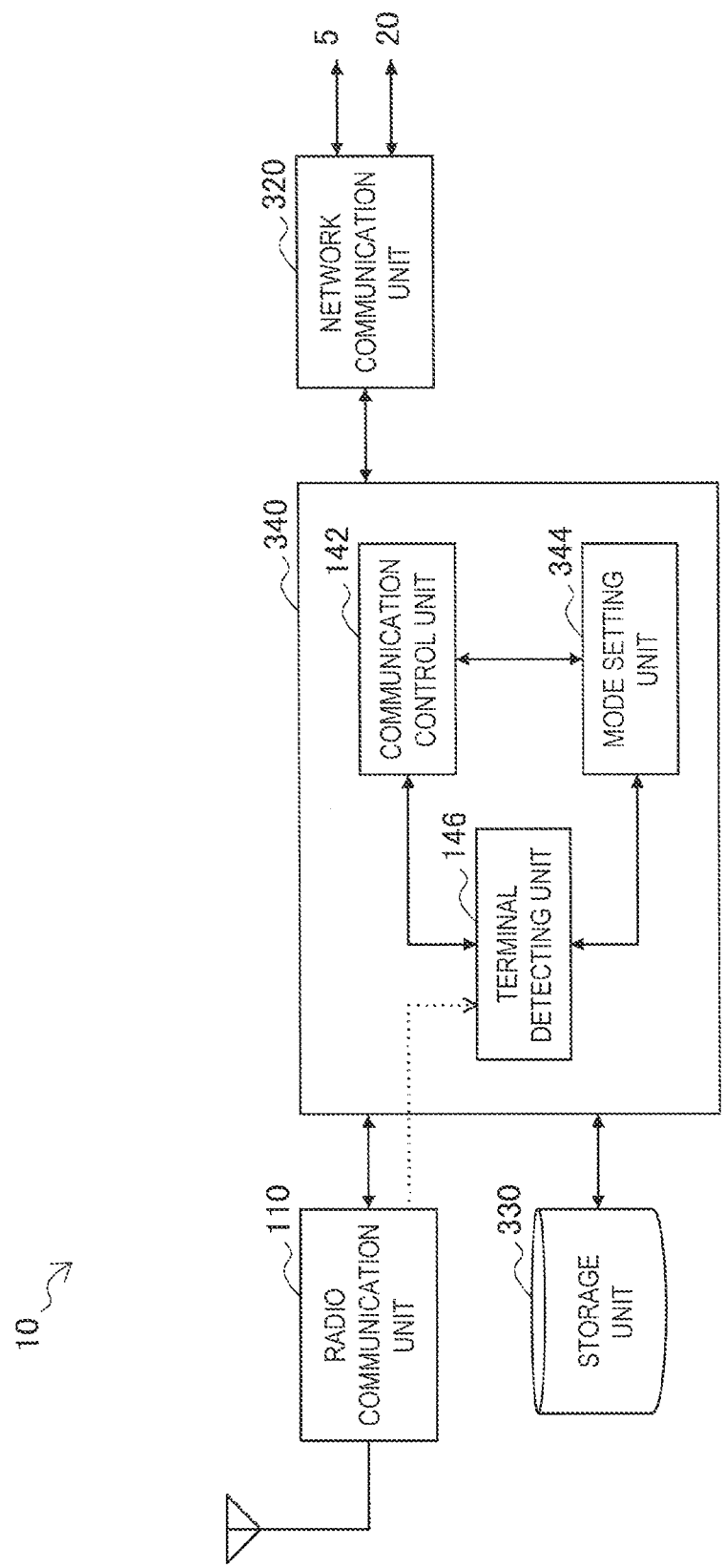
FIG. 10 is a block diagram illustrating one example of a configuration of a small cell base station according to the second embodiment.

FIG. 10 is a block diagram illustrating one example of a configuration of a small cell base station 10 according to the second embodiment. Referring to FIG. 10, the small cell base station 10 includes a radio communication unit 110, a network communication unit 320, a storage unit 330 and a control unit 340.

(1) Network Communication Unit

The network communication unit 320 establishes a back haul link with the macro cell base station 20 and mediates communication between the small cell base station 10 and the macro cell base station 20. The back haul link is also utilized in communication between the small cell base station 10 and other small cell base stations (for example, a small cell base station belonging to the same small cell cluster).

(2) Storage Unit

The storage unit 330 stores a program and data for operation of the small cell base station 10 using a storage medium such as a hard disk and a semiconductor memory. The data stored by the storage unit 330 can include, for example, resource configuration data acquired from an external apparatus. Further, the data stored by the storage unit 330 can include data regarding the small cell cluster to which the small cell base station 10 belongs (for example, a sub-set of cell data which will be described later).

(3) Control Unit

The control unit 340 controls general operation of the small cell base station 10 using a processor such as a CPU and a DSP. In the present embodiment, the control unit 340 includes a communication control unit 142, a mode setting unit 344 and a terminal detecting unit 146.

The mode setting unit 344 sets the operation mode which can be selected from a set of operation modes which can include the active mode and the standby mode to the radio communication unit 110. For example, when the number of terminal apparatuses 30 connected to the radio communication unit 110 becomes zero, the mode setting unit 344 switches the operation mode of the radio communication unit 110 from the active mode to the standby mode. Further, when the terminal detecting unit 146 detects a terminal existing in the vicinity while the operation mode is set at the standby mode, the mode setting unit 344 selects a small cell to be activated among small cells included in the small cell cluster to which the small cell base station 10 belongs. The mode setting unit 344 may select a small cell to be activated according to priority for each small cell defined by the cell data with reference to cell data stored by the storage unit 330. A specific example of a structure of the cell data will be described later. It should be noted that selection criteria of the small cell to be activated is not limited to priority defined in advance, and may be any criteria relating to a parameter such as, for example, the measured strength of the uplink signal, a cell size and remaining battery capacity (in the case of a battery-powered apparatus).

When the small cell 18 operated by the own apparatus is selected as a cell to be activated, the mode setting unit 344 switches the operation mode of the radio communication unit 110 to the active mode. On the other hand, when another small cell included in the small cell cluster is selected as a cell to be activated, the mode setting unit 344 transmits an activation request to a base station of the selected another small cell. The activation request may be transmitted via a back haul link (for example, on the X2 interface). Alternatively, the activation request may be transmitted on a random access channel of a small cell base station to which the activation request is addressed via the radio communication unit 110.

Even when a terminal is not detected in the own apparatus, when an activation request is received from another small cell base station detecting a terminal in the vicinity, the mode setting unit 344 switches the operation mode of the radio communication unit 110 to the active mode. The mode setting unit 344 then transmits a message for signaling switching of the operation mode to the active mode to the macro cell base station 20 via the back haul link.

If there is no such a mechanism for selectively activating only part of small cells within the small cell cluster, a plurality of small cells disposed at high density in a narrow region are activated at the same time, which results in a risk of reducing system capacity due to interference of signals with each other. However, if only part of small cells is selectively activated as in the present embodiment, it is possible to avoid occurrence of such harmful interference, so that it is possible to make use of small cells further efficiently.

It should be noted that selection of small cells to be activated may be executed by an external apparatus (for example, the macro cell base station 20 or an upper node of the macro cell base station 20) instead of being executed by the mode setting unit 344 of the small cell base station 10. In this case, the mode setting unit 344 can transmit a terminal detection message to the external apparatus and receive a selection result of a small cell from the external apparatus.

The terminal detecting unit 146 executes monitoring of strength of an uplink signal transmitted in the macro cell 28 while the operation mode of the radio communication unit 110 is set at the standby mode. In the present embodiment, the standby mode may include a monitoring mode in which monitoring of the strength of the uplink signal is executed by the terminal detecting unit 146 and a sleep mode in which the monitoring is not executed. In the sleep mode, the terminal detecting unit 146 does not monitor the strength of the uplink signal. In this case, the mode setting unit 344 switches the operation mode of the radio communication unit 110 to the active mode only when a terminal is detected by another small cell base station belonging to the same small cell cluster and an activation request is received. When the activation request is received via the network communication unit 320, it is possible to completely stop supply of power to the radio communication unit 110 in the sleep mode.

The mode setting unit 344 may switch the operation mode of the radio communication unit 110 to the standby mode (the monitoring mode or the sleep mode) when no terminal is connected to the small cell 18 until a certain timing after the operation mode is switched to the active mode, or when the mode setting unit 344 is notified that handover is not executed from an external apparatus.

[3-3. Configuration Example of Macro Cell Base Station]

Figure 11:
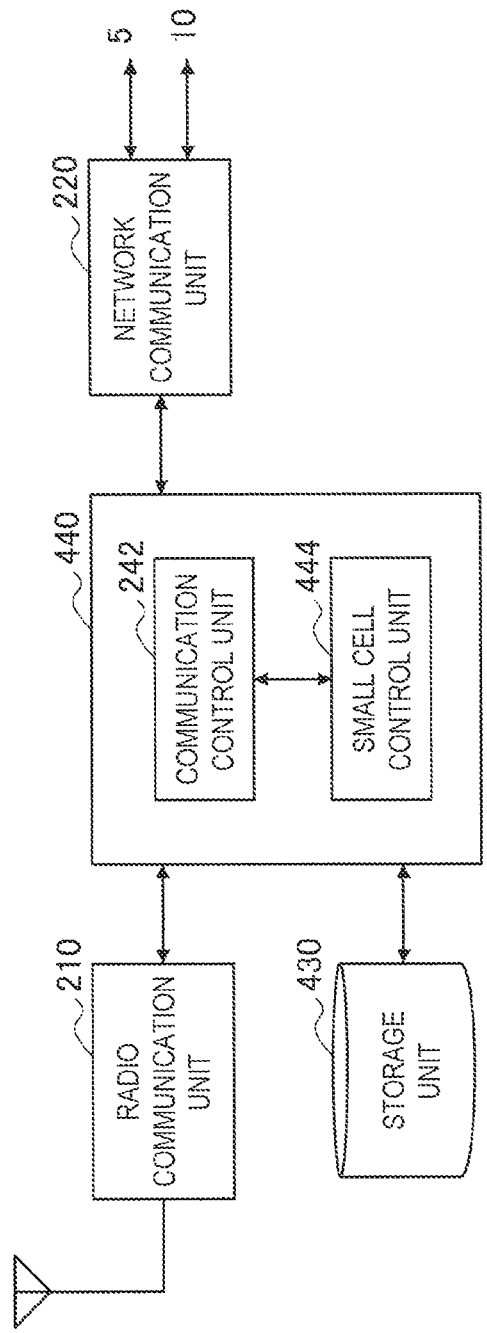
FIG. 11 is a block diagram illustrating one example of a configuration of a macro cell base station according to the second embodiment.

FIG. 11 is a block diagram illustrating one example of a configuration of a macro cell base station 20 according to the second embodiment. Referring to FIG. 11, the macro cell base station 20 includes a radio communication unit 210, a network communication unit 220, a storage unit 430 and a control unit 440.

(1) Storage Unit

The storage unit 430 stores a program and data for operation of the macro cell base station 20 using a storage medium such as a hard disk and a semiconductor memory. The data stored by the storage unit 430 can include, for example, resource configuration data to be distributed to the small cell base station 10. Further, the data stored by the storage unit 430 can include cell data 431 illustrated in FIG. 12.

Figure 14:
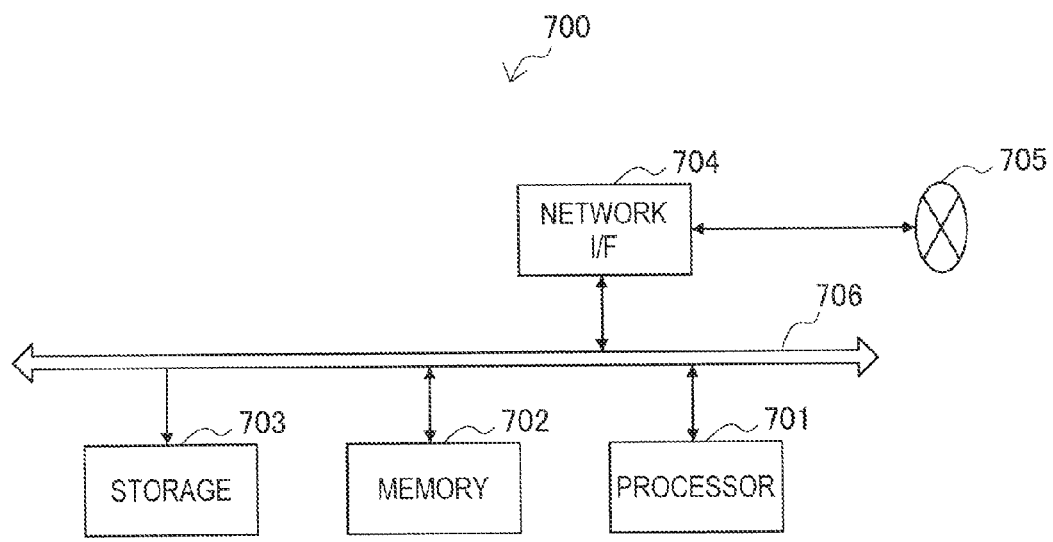
FIG. 14 is a block diagram illustrating one example of a schematic configuration of a management server.

FIG. 14 is an explanatory diagram illustrating one example of a structure of the cell data 431. The cell data 431 includes six data items of a cell ID 432, a related macro cell 433, a base station (BS) location 434, a current mode 435, a cluster ID 436 and activation priority 437. The cell ID is an identifier for uniquely identifying each of one or more macro cells and one or more small cells. The related macro cell 433 indicates a cell ID of the macro cell associated with each small cell. According to the example in FIG. 12, the small cells having cell IDs "SC1" to "SC5" are all associated with the macro cell having a cell ID "MC1" (that is, disposed so as to overlap with the macro cell). If the related macro cell 433 is blank, information regarding the macro cell is defined in the record. The BS location 434 indicates a geographical location of a base station operating each small cell. The current mode 435 indicates a current operation mode of each small cell. The cluster ID 436 is an identifier for identifying a small cell cluster to which each small cell belongs. In the example of FIG. 12, small cells having cell IDs "SC1", "SC2" and "SC3" belong to a small cell cluster having a cluster ID "CL11". Small cells having cell IDs "SC4" and "SC5" belong to a small cell cluster having a cluster ID "CL12". The activation priority 437 indicates priority of activation of each small cell in the same cluster. For example, when attention is focused on a cluster ID "CL11", when a terminal is detected, among small cells having cell IDs "SC1", "SC2" and "SC3", a small cell having a cell ID "SC1" which has the smallest value of the activation priority 437 can be preferentially activated.

(2) Control Unit

The control unit 440 controls general operation of the macro cell base station 20 using a processor such as a CPU and a DSP. In the present embodiment, the control unit 440 includes a communication control unit 242 and a small cell control unit 444.

The small cell control unit 444 controls operation of the small cell base station 10 operating the small cell 18 which overlaps with the macro cell 28. For example, when each small cell cell 18 is initially registered, the small cell control unit 444 adds a record regarding the small cell to the cell data 431 stored by the storage unit 430. Further, when the operation mode of the small cell base station 10 changes or the small cell base station 10 moves, the small cell control unit 444 updates the cell data 431.

The small cell control unit 444 may distribute the whole or a sub-set of the cell data 431 to each small cell base station 10. By this means, when each small cell base station 10 detects a terminal existing in the vicinity, the small cell base station 10 can autonomously select a small cell to be activated. Alternatively, the small cell control unit 444 may select a small cell base station to be activated with reference to the cell data 431 in response to reception of the terminal detection message from each small cell base station 10. When a small cell base station to be activated is selected, the small cell control unit 444 transmits the selection result to the small cell base station which is a transmission source of the terminal detection message and transmits an activation request to the selected small cell base station. Further, when a message indicating that the small cell 18 is activated in response to detection of a terminal is received from the small cell base station 10, the small cell control unit 444 makes the radio communication unit 210 transmit a measurement instruction message to at least one terminal apparatus 30 connected to the macro cell 28.

When it is determined that no terminal apparatus 30 should perform handover to the small cell base station 10 which detects a terminal in the vicinity as a result of handover determination, the small cell control unit 444 may notify the small cell base station 10 that handover is not executed. Further, the small cell control unit 444 may provide a determination threshold for terminal detection to be used by the small cell base station 10 to the small cell base station 10. As described above, the determination threshold for terminal detection may be a fixed value defined in advance or a dynamically set value. Further, the small cell control unit 444 may transmit the resource configuration data to the small cell base station 10 via the network communication unit 220.

[3-4. Management of Cell Data]

It should be noted that a management function for managing the cell data 431 of the macro cell base station 20 described in this section may be implemented at an upper node (for example, a control node in the core network 5 or the Internet 7) of the macro cell base station 20. The management function enables exchange of signaling with the small cell base station 10 and enables recognition of a current operation mode for each small cell base station 10 regardless of at which node the management function is implemented. Association between each small cell base station 10 and the macro cell 28 may be manually registered and updated by an operator. Alternatively, the association between each small cell base station 10 and the macro cell 28 may be automatically registered and updated based on one or more of location data reported from the small cell base station 10, a cell ID and a quality index included in the measurement report received from the terminal apparatus 30 and a result of measurement of signal strength executed at each base station.

[3-5. Processing Flow]

Figure 13:
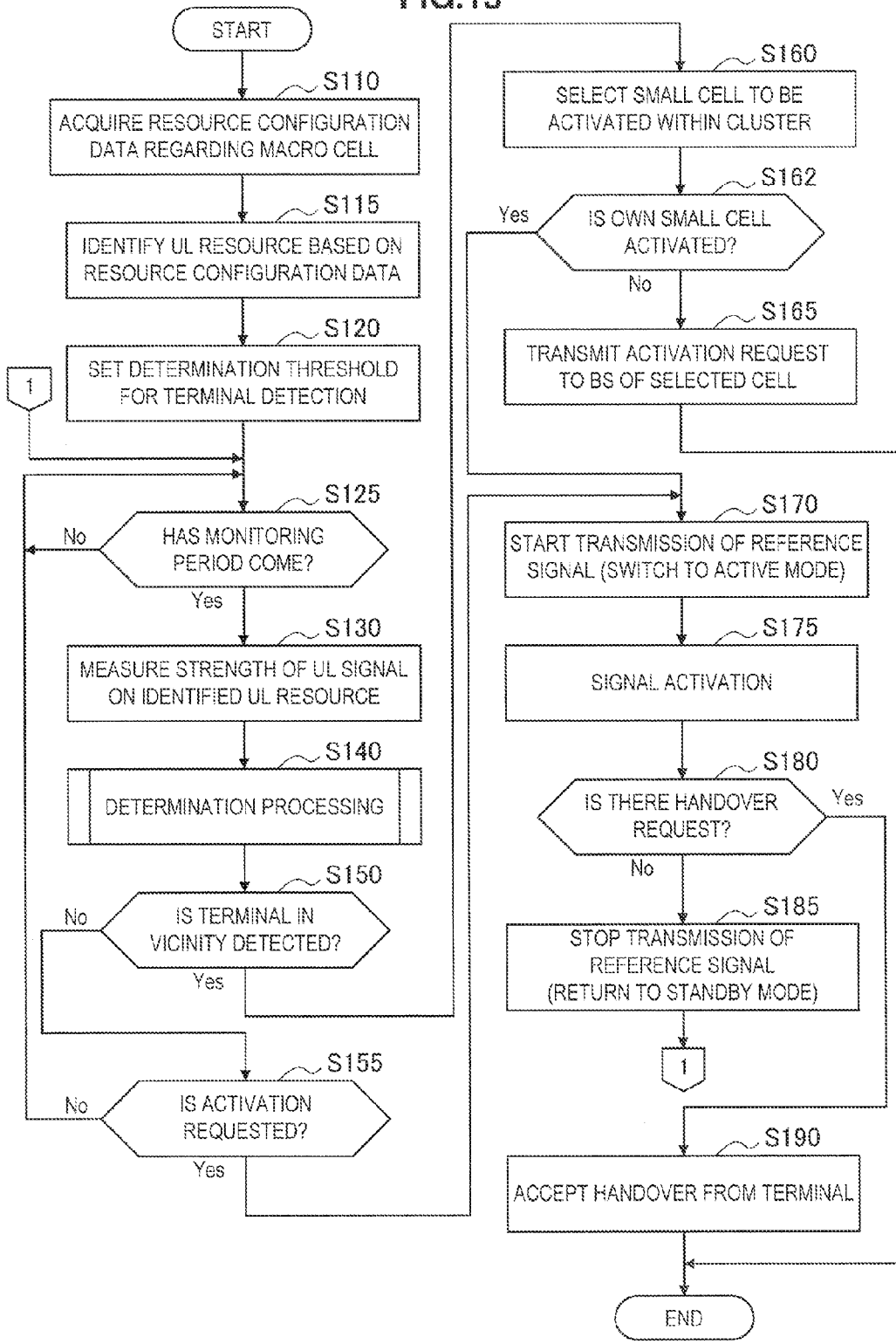
FIG. 13 is a flowchart illustrating one example of flow of terminal detection processing executed by the small cell base station according to the second embodiment.

FIG. 13 is a flowchart illustrating one example of flow of terminal detection processing executed by the small cell base station 10 according to the second embodiment. The terminal detection processing illustrated in FIG. 13 is started when the operation mode of the small cell base station 10 is set at the standby mode (monitoring mode).

Referring to FIG. 13, first, the terminal detecting unit 146 acquires resource configuration data regarding the macro cell 28 from an external apparatus (step S110). The terminal detecting unit 146 then identifies uplink resource to be monitored based on the acquired resource configuration data (step S115). The terminal detecting unit 146 then sets a determination threshold for terminal detection (step S120).

The terminal detecting unit 146 then waits for coming of a monitoring period (step S125). When the monitoring period comes, the terminal detecting unit 146 measures received signal strength on the uplink resource identified based on the resource configuration data (step S130). The terminal detecting unit 146 then detects a terminal existing in the vicinity of the small cell base station 10 by executing determination processing based on the measured received signal strength (step S140).

When a terminal in the vicinity is not detected in step S140 (step S150), the mode setting unit 344 determines whether an activation request is received from another node (step S155). Here, when an activation request is not received, the processing returns to step S125. On the other hand, if an activation request is received, the processing proceeds to step S170.

When a terminal in the vicinity is detected in step S140, the mode setting unit 344 selects a small cell to be activated among small cells within a small cell cluster to which the own apparatus belongs (step S160). Selection of a small cell here may be performed by the mode setting unit 344 referring to a sub-set of the cell data 431 as described above. Alternatively, the mode setting unit 344 may inquire about which small cell should be activated to the macro cell base station 20.

Subsequently, the mode setting unit 344 determines whether a small cell operated by the own apparatus is selected as a cell to be activated (step S162). When other small cells are selected, the mode setting unit 344 transmits an activation request to the small cell base station which operates the other small cells (step S165).

On the other hand, when the small cell operated by the own apparatus is selected as a cell to be activated, the mode setting unit 344 switches the operation mode of the radio communication unit 110 to the active mode to make the radio communication unit 110 start transmission of a reference signal (step S170). Further, the mode setting unit 344 signals switching of the operation mode to the active mode to the macro cell base station 20 and other small cell base stations (step S175).

Subsequently, the communication control unit 142 waits for reception of a handover request (step S180). When a handover request is not received until a certain timing after the operation mode is switched to the active mode or handover is not executed, the mode setting unit 344 makes the radio communication unit 110 stop transmission of the reference signal and returns the operation mode of the radio communication unit 110 to the standby mode (step S185). Then, the processing returns to step S125.

On the other hand, when a request for handover to the small cell base station 10 itself as a target base station is received, the mode setting unit 344 maintains the active mode, and connection with the terminal apparatus 30 is established by the radio communication unit 110 through handover procedure (step S190).

It should be noted that FIG. 13 illustrates one example of flow of processing mainly executed in the monitoring mode.

In the sleep mode, processing in steps S110 to S150 and steps S160 to S165 relating to monitoring may be omitted.

4. Application Example

The technique according to the present disclosure can be applied to various products. For example, a management server having a management function of cell data may be implemented as an upper node of the macro cell base station 20 in a form of a tower server, a lack server, a blade server, or the like. Further, the management function of the cell data may be implemented in a control module mounted on the management server (for example, an integrated circuit module configured with one die, or a card or a blade inserted into a slot of the blade server).

For example, the small cell base station 10 and the macro cell base station 20 may be realized as any type of evolved Node B (eNB). A small eNB may be an eNB that covers a cell smaller than a macro cell, such as a pico eNB, micro eNB, or home (femto) eNB. Instead, the small cell base station 10 and the macro cell base station 20 may be realized as any other types of base stations such as a NodeB and a base transceiver station (BTS). The macro cell base station 20 may include a main body (that is also referred to as a base station apparatus) configured to control radio communication, and one or more remote radio heads (RRH) disposed in a different place from the main body. Additionally, various types of terminals to be discussed later may also operate as the small cell base station 10 by temporarily or semi-permanently executing a base station function.

For example, a terminal apparatus 30 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus 30 may also be realized as a terminal (that is also referred to as a machine type communication (MTC) terminal) that performs machine to machine (M2M) communication. Furthermore, a radio communication module (such as an integrated circuit module including a single die) mounted on the terminal apparatus 30 may be provided.

[4-1. Application Example Regarding Management Server]

FIG. 14 is a block diagram illustrating an example of a schematic configuration of a management server 700 to which the technology of the present disclosure may be applied. The management server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

Because the management server 700 illustrated in FIG. 14 plays a role of managing the cell data 431 as described using FIG. 12, even if a number of small cells are deployed within the system, it is possible to integrally and cooperatively execute control of the operation modes of these small cells.

[4-2. Application Examples Regarding Base Station]

First Application Example

Figure 15:
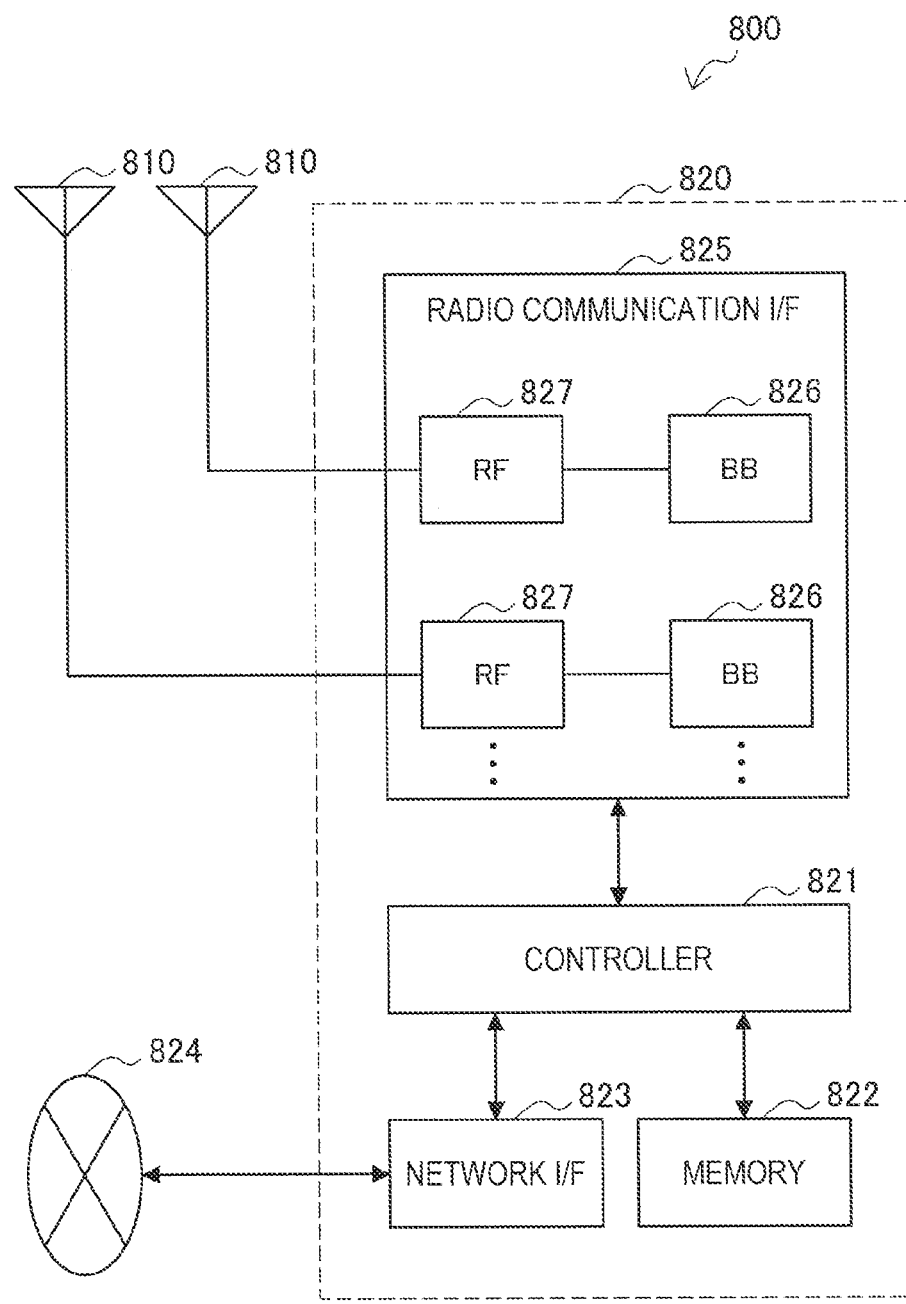
FIG. 15 is a block diagram illustrating a first example of a schematic configuration of an eNB.

FIG. 15 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 15. For example, the multiple antennas 810 may be compatible with multiple frequency bands used by the eNB 800. Although FIG. 15 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 1. For example, the multiple BB processors 826 may be compatible with multiple frequency bands used by the eNB 800. The radio communication interface 825 may include the multiple RF circuits 827, as illustrated in FIG. 15. For example, the multiple RF circuits 827 may be compatible with multiple antenna elements. Although FIG. 15 illustrates the example in which the radio communication interface 825 includes the multiple BB processors 826 and the multiple RF circuits 827, the radio communication interface 825 may also include a single BB processor 826 or a single RF circuit 827.

Second Application Example

Figure 16:
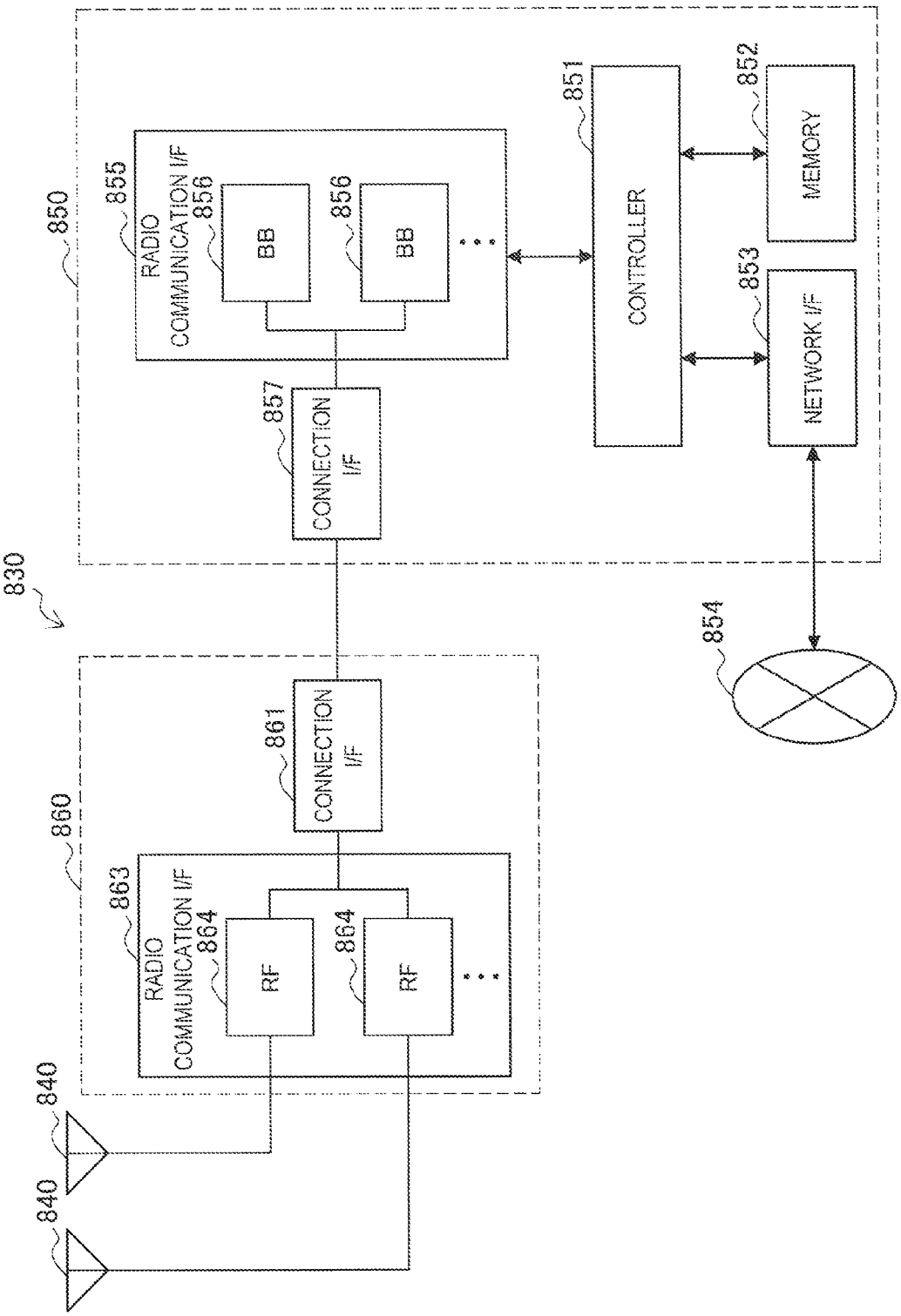
FIG. 16 is a block diagram illustrating a second example of a schematic configuration of an eNB.

FIG. 16 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 16. For example, the multiple antennas 840 may be compatible with multiple frequency bands used by the eNB 830. Although FIG. 16 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 15.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 15, except the BB processor 856 is connected to the RF circuit 864 of the RRH 860 via the connection interface 857. The radio communication interface 855 may include the multiple BB processors 856, as illustrated in FIG. 16. For example, the multiple BB processors 856 may be compatible with multiple frequency bands used by the eNB 830. Although FIG. 16 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 16. For example, the multiple RF circuits 864 may support multiple antenna elements. Although FIG. 16 illustrates the example in which the radio communication interface 863 includes the multiple RF circuits 864, the radio communication interface 863 may also include a single RF circuit 864.

The eNB 800 illustrated in FIG. 15 may be utilized as the small cell base station 10 described in the present specification. For example, the communication control unit 142, the mode setting unit 144 and the terminal detecting unit 146 according to the first embodiment or the mode setting unit 344 according to the second embodiment may be implemented at the radio communication interface 825. Further, at least part of these functions may be implemented at the controller 821.

Further, the eNB 800 and eNB 830 illustrated in FIG. 15 and FIG. 16 may be utilized as the macro cell base station 20 described in the present specification. For example, the communication control unit 242 and the small cell control unit 244 according to the first embodiment or the small cell control unit 444 according to the second embodiment may be implemented at the radio communication interface 825 and the radio communication interface 855 and/or the radio communication interface 863. Further, at least part of these functions may be implemented at the controller 821 and the controller 851.

[4-3. Application Examples Regarding Terminal Apparatus]

First Application Example

Figure 17:
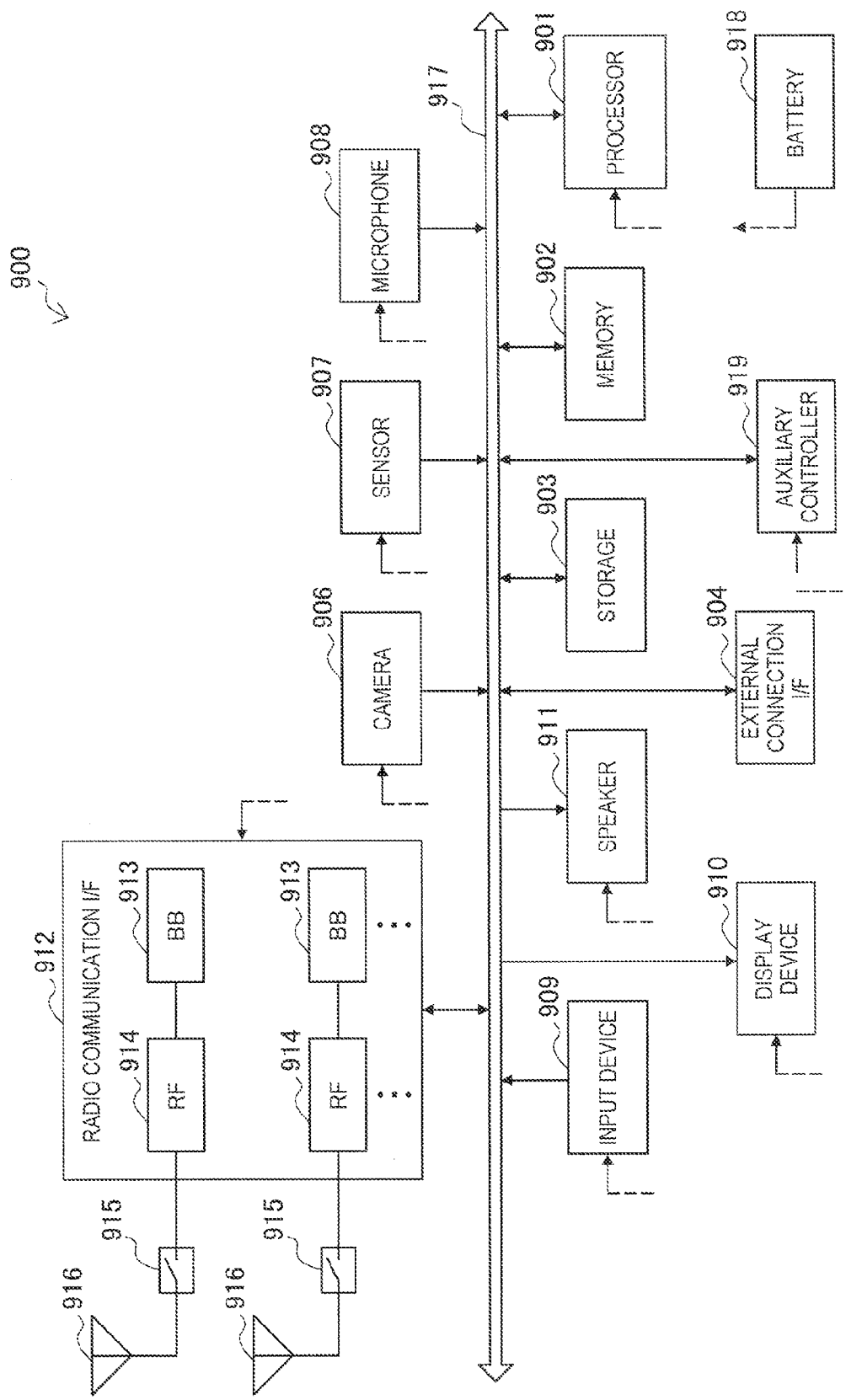
FIG. 17 is a block diagram illustrating an example of a schematic configuration of a smartphone.

FIG. 17 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 17. Although FIG. 17 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 17. Although FIG. 17 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 17 via feeder lines, which are partially shown as dashed lines in the figure. The auxiliary controller 919 operates a minimum necessary function of the smartphone 900, for example, in a sleep mode.

When the smartphone 900 illustrated in FIG. 17 operates as the small cell base station 10, the communication control unit 142, the mode setting unit 144 and the terminal detecting unit 146 according to the first embodiment or the mode setting unit 344 according to the second embodiment may be implemented at the radio communication interface 912. Further, at least part of these functions may be implemented at the processor 901 or the auxiliary controller 919. Further, the smartphone 900 may be utilized as the terminal apparatus 30.

Second Application Example

FIG. 18 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 18. Although FIG. 18 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 18. Although FIG. 18 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 18 via feeder lines that are partially shown as dashed lines in the figure. The battery 938 accumulates power supplied form the vehicle.

When the car navigation apparatus 920 illustrated in FIG. 18 operates as the small cell base station 10, the communication control unit 142, the mode setting unit 144 and the terminal detecting unit 146 according to the first embodiment or the mode setting unit 344 according to the second embodiment may be implemented at the radio communication interface 933. Further, at least part of these functions may be implemented at the processor 921. Further, the car navigation apparatus 920 may be utilized as the terminal apparatus 30.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

5. Conclusion

The embodiments of the technique according to the present disclosure have been described above in detail using FIG. 1 to FIG. 18. According to the above-described embodiments, in a radio communication apparatus which provides radio communication service to one or more terminals within a small cell, by monitoring strength of an uplink signal transmitted in a macro cell which overlaps with the small cell while the operation mode is set at a standby mode, a terminal in the vicinity is detected, and the operation mode of the radio communication apparatus is switched to an active mode in response to detection of the terminal. Accordingly, a small cell base station which is put into a standby state can detect a terminal in a timely manner and can provide an opportunity for handover to the small cell to the terminal. At this time, because a reference signal from the small cell base station which is put into a standby state or a radio signal such as an activation request from the terminal is not randomly transmitted, interference within the system does not increase, so that adverse effect of degradation of the overall capacity of the system and degradation of power consumption does not occur.

Further, according to the above-described embodiments, when the strength of the uplink signal monitored on the uplink resource of the macro cell exceeds the determination threshold, it is determined that a terminal exists in the vicinity of the above-described small cell base station. Therefore, it is possible to autonomously detect a terminal while the small cell base station is put into a standby state without relying on a positioning system such as a GPS which cannot provide sufficient positioning accuracy. Further, according to this configuration, a terminal which transmits more uplink data is more likely to be detected. Therefore, even if a terminal which rarely transmits a signal exists in the vicinity of the small cell base station which is put into a standby state, such a terminal which does not require handover is not even detected. Accordingly, for example, the above-described mechanism is favorably adapted to application of a small cell in terms of distribution of traffic load of the macro cell. It should be noted that when the terminal recognizes activation of the small cell base station in the vicinity by itself, the terminal may be connected to the small cell base station by executing cell selection procedure without waiting for an instruction of handover.

Further, according to the embodiment in which a small cell cluster is formed, when a terminal is detected through monitoring of the strength of the uplink signal transmitted in the macro cell, only the operation mode of part of the small cells selected from the small cell cluster is switched to an active mode. According to this configuration, it is possible to eliminate a risk of degradation of system capacity due to interference of signals with each other as a result of activation of a plurality of small cells disposed at high density in a narrow region at the same time. By this means, it is possible to avoid occurrence of harmful interference, so that it is possible to make use of small cells further efficiently.

Note that the series of control processing by the respective apparatuses described herein may be implemented by using any of software, hardware, and a combination of software and hardware. Programs constituting the software are previously stored in, for example, a recording medium (a non-transitory medium) provided in the inside or the outside of the respective apparatuses. And the respective programs are, for example, read into a random access memory (RAM) during execution and executed by the processor such as the CPU.

Further, the processes described using the flowcharts in the present description may not necessarily be executed in the order indicated by the flowchart. Some process steps may be executed in parallel. Further, additional process steps may be employed, and some process steps may be omitted.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A radio communication apparatus including:

a radio communication unit configured to provide radio communication service to one or more terminals within a second cell which overlaps with a first cell;

a detecting unit configured to detect a terminal existing in the vicinity by monitoring strength of an uplink signal transmitted in the first cell while an operation mode of the radio communication unit is set at a standby mode; and a mode setting unit configured to switch the operation mode of the radio communication unit to an active mode when the detecting unit detects the terminal existing in the vicinity.

(2)

The radio communication apparatus according to (1), wherein when the strength of the uplink signal exceeds a determination threshold, the detecting unit determines that the terminal exists in the vicinity of the radio communication apparatus.

(3)

The radio communication apparatus according to (2), wherein the determination threshold is set larger when a distance between a base station in the first cell and the radio communication unit is larger.

(4)

The radio communication apparatus according to (2) or (3), wherein the detecting unit dynamically sets the determination threshold based on strength of a downlink signal received from a base station in the first cell.

(5)

The radio communication apparatus according to any one of (2) to (4), wherein when the strength of the uplink signal continuously exceeds the determination threshold over a predetermined time length, the detecting unit determines that the terminal exists in the vicinity of the radio communication apparatus.

(6)

The radio communication apparatus according to any one of (2) to (4), wherein when a measurement result of the strength of the uplink signal matches a predetermined pattern, the detecting unit determines that the terminal exists in the vicinity of the radio communication apparatus.

(7)

The radio communication apparatus according to any one of (1) to (6), wherein the radio communication unit transmits a signal for making a terminal recognize the second cell in the active mode.

(8)

The radio communication apparatus according to (7), wherein when the detecting unit detects the terminal in the vicinity, the mode setting unit signals switching of the operation mode to the active mode to a base station in the first cell or an external apparatus which is an upper node of the base station.

(9)

The radio communication apparatus according to (8), wherein when no terminal is connected to the second cell until a certain timing after the operation mode is switched to the active mode, the mode setting unit switches the operation mode to the standby mode.

(10)

The radio communication apparatus according to (8), wherein when the mode setting unit is notified from the external apparatus that handover is not executed in response to the signaling of switching to the active mode, the mode setting unit switches the operation mode to the standby mode.

(11)

The radio communication apparatus according to any one of (1) to (10), wherein the detecting unit identifies uplink resource through which the uplink signal is transmitted based on resource configuration data regarding the first cell acquired from a base station in the first cell or an external apparatus which is an upper node of the base station.

(12)

The radio communication apparatus according to any one of (1) to (11), wherein the first cell is a macro cell, and wherein the second cell is a small cell.

(13)

The radio communication apparatus according to (12), wherein the second cell is one of a plurality of small cells forming a small cell cluster, and wherein when the detecting unit detects the terminal existing in the vicinity, and when the second cell is selected as a cell to be activated from the small cell cluster, the mode setting unit switches the operation mode to the active mode.

(14)

The radio communication apparatus according to (13), wherein when the detecting unit detects the terminal existing in the vicinity, and when other small cell is selected as the cell to be activated from the small cell cluster, the mode setting unit transmits an activation request to a base station of the selected other small cell.

(15)

The radio communication apparatus according to (13) or (14), wherein also when an activation request is received from a base station of other small cell which detects a terminal existing in the vicinity, the mode setting unit switches the operation mode to the active mode.

(16)

A radio communication method of a radio communication apparatus, the method including:

detecting a terminal existing in the vicinity by monitoring strength of an uplink signal transmitted in the first cell while an operation mode of the radio communication apparatus is set at a standby mode, the radio communication apparatus providing radio communication service to one or more terminals in a second cell which overlaps with a first cell; and switching the operation mode of the radio communication apparatus to an active mode when the terminal existing in the vicinity is detected.

(17)

A communication control apparatus including:

a communication unit configured to receive, from a radio communication apparatus, a message indicating that a terminal existing in the vicinity of the radio communication apparatus is detected while the radio communication apparatus is set at a standby mode, the radio communication apparatus providing radio communication service to one or more terminals within a second cell which overlaps with a first cell; and a control unit configured to instruct at least one terminal connected to the first cell to perform measurement in response to reception of the message.

(18)

The communication control apparatus according to (17), wherein the control unit executes handover determination for the at least one terminal based on a measurement report from the at least one terminal which executes measurement in response to the instruction.

(19)

The communication control apparatus according to (17) or (18), wherein the message further indicates that the radio communication apparatus is activated.

(20)

A communication control method of a communication control apparatus, the method including:

receiving, from a radio communication apparatus, a message indicating that a terminal existing in the vicinity of the radio communication apparatus is detected while the radio communication is set at a standby mode, the radio communication apparatus providing radio communication service to one or more terminals within a second cell which overlaps with a first cell; and instructing at least one terminal connected to the first cell to perform measurement in response to reception of the message.

REFERENCE SIGNS LIST 1, 3 radio communication system
10 small cell base station
18 small cell
110 radio communication unit
120, 320 network communication unit
130, 330 storage unit
140, 340 control unit
142 communication control unit
144, 344 mode setting unit
146 terminal detecting unit
20 macro cell base station
28 macro cell
210 radio communication unit
220 network communication unit
230, 430 storage unit
240, 440 control unit
242 communication control unit 244, 444 small cell control unit
30 terminal apparatus

The invention claimed is:
1. A radio communication apparatus, comprising:
a radio communication unit configured for radio communication service to at least one terminal apparatus,
wherein the at least one terminal apparatus is located within a first cell which overlaps with a second cell;
a detecting unit configured to:
monitor a first strength of an uplink signal transmitted by the at least one terminal apparatus, and
detect the at least one terminal apparatus that exists at a first distance less than a first signal strength threshold from the radio communication apparatus, based on the monitored first strength of the uplink signal and on an operation mode of the radio communication unit set at a standby mode; and
a mode setting unit configured to:
switch the operation mode of the radio communication unit from the standby mode to an active mode, based on the detection of the at least one terminal apparatus that exists at the first distance,
receive a notification signal that indicates a failure of a handover, wherein the handover is based on the switch of the operation mode from the standby mode to the active mode, and
switch the operation mode of the radio communication unit from the active mode to the standby mode based on the received notification signal.

2. The radio communication apparatus according to claim 1, wherein the detecting unit is further configured to detect the at least one terminal apparatus that exists at the first distance from the radio communication apparatus, based on the monitored first strength of the uplink signal greater than a second signal strength threshold.

3. The radio communication apparatus according to claim 2, wherein the detecting unit is further configured to increase the second signal strength threshold based on an increase in a second distance between a base station and the radio communication unit, wherein the base station is in the second cell.

4. The radio communication apparatus according to claim 2, wherein the detecting unit is further configured to set the second signal strength threshold based on a second strength of a downlink signal, wherein the downlink signal is received from a base station in the second cell.

5. The radio communication apparatus according to claim 2, wherein the detecting unit is further configured to detect the at least one terminal apparatus that exists at the first distance from the radio communication apparatus, based on the monitored first strength of the uplink signal greater than the second signal strength threshold over a time period.

6. The radio communication apparatus according to claim 2, wherein the detecting unit is further configured to detect the at least one terminal apparatus that exists at the first distance from the radio communication apparatus, based on the uplink signal that matches a pattern.

7. The radio communication apparatus according to claim 1, wherein the radio communication unit is further configured to transmit a first signal,
wherein the at least one terminal apparatus recognizes the first cell in the active mode, based on the transmitted first signal.

8. The radio communication apparatus according to claim 7, wherein the mode setting unit is further configured to transmit a second signal to one of a base station or an external apparatus that is an upper node of the base station, wherein the transmitted second signal indicates the switch of the operation mode from the standby mode to the active mode.

9. The radio communication apparatus according to claim 8, wherein the mode setting unit is further configured to switch the operation mode of the radio communication unit from the active mode to the standby mode, based on a disconnection of the at least one terminal apparatus from the first cell, wherein the at least one terminal apparatus is disconnected over a time period that initiates subsequent to the switch of the operation mode from the standby mode to the active mode the mode.

10. The radio communication apparatus according to claim 8, wherein the mode setting unit is further configured to receive the notification signal from the external apparatus.

11. The radio communication apparatus according to claim 1, wherein the detecting unit is further configured to:
acquire resource configuration data, associated with the second cell, from one of a base station in the second cell or an external apparatus which is an upper node of the base station, and
identify an uplink resource based on the acquired resource configuration data, wherein the uplink signal is transmitted based on the uplink resource.

12. The radio communication apparatus according to claim 1, wherein the first cell is a small cell, and wherein the second cell is a macro cell.

13. The radio communication apparatus according to claim 12, wherein the first cell is one of a plurality of small cells, wherein the plurality of small cells forms a small cell cluster, and
wherein the mode setting unit is further configured to switch the operation mode of the radio communication unit from the standby mode to the active mode, based on a first selection of the first cell as a cell to be activated from the small cell cluster.

14. The radio communication apparatus according to claim 13, wherein the mode setting unit is further configured to transmit an activation request to a base station of a third cell, of the plurality of small cells, based on a second selection of the third cell as the cell to be activated from the small cell cluster.

15. The radio communication apparatus according to claim 13, wherein the mode setting unit is further configured to switch the operation mode of the radio communication unit from the standby mode to the active mode, based on an activation request received from a base station of a third cell, of the plurality of small cells, wherein the base station detects the at least one terminal apparatus that exists at a second distance, less than the first signal strength threshold, from the base station.

16. A radio communication method of a radio communication apparatus, comprising:
monitoring a strength of an uplink signal transmitted by at least one terminal apparatus located in a first cell;
detecting the at least one terminal apparatus that exists at a distance less than a signal strength threshold from the radio communication apparatus, based on the monitored strength of the uplink signal and on an operation mode of the radio communication apparatus set at a standby mode,
wherein the radio communication apparatus providing radio communication service to the at least one terminal apparatus, and
wherein the first cell overlaps with a second cell;
switching the operation mode of the radio communication apparatus from the standby mode to an active mode, based on the detection of the at least one terminal apparatus that exists at the distance;

receiving a notification signal that indicates a failure of a handover, wherein the handover is based on the switching of the operation mode from the standby mode to the active mode; and switching the operation mode of the radio communication apparatus from the active mode to the standby mode based on the received notification signal.

17. A communication control apparatus, comprising:

a communication unit configured to receive, from a radio communication apparatus, a message that indicates a detection of at least one terminal apparatus that exists at a distance less than a signal strength threshold from the radio communication apparatus, based on an operation mode of the radio communication apparatus set at a standby mode, wherein the radio communication apparatus provides radio communication service to the at least one terminal apparatus, wherein the at least one terminal apparatus is within a first cell that overlaps with a second cell, wherein the radio communication apparatus monitors a strength of an uplink signal transmitted by the at least one terminal apparatus, wherein the radio communication apparatus detects the at least one terminal apparatus that exists at the distance from the radio communication apparatus, based on the monitored strength of the uplink signal, wherein the radio communication apparatus switches the operation mode from the standby mode to an active mode based on the detection of the at least one terminal apparatus that exists at the distance, wherein the radio communication apparatus receives a notification signal that indicates a failure of a handover, wherein the handover is based on the switch of the operation mode from the standby mode to the active mode, and wherein the radio communication apparatus switches the operation mode from the active mode to the standby mode based on the received notification signal; and a control unit configured to instruct the at least one terminal apparatus to measure a quality of a signal, wherein the signal is transmitted by a base station, and wherein the instruction is based on the received message.

18. The communication control apparatus according to claim 17, wherein the control unit is further configured to determine the handover for the at least one terminal apparatus, based on the measured quality of the signal.

19. The communication control apparatus according to claim 17, wherein the message indicates that the radio communication apparatus is in the active mode.

20. A communication control method of a communication control apparatus, comprising:

receiving, from a radio communication apparatus, a message indicating a detection of at least one terminal apparatus that exists at a distance less than a signal strength threshold from the radio communication apparatus, based on an operation mode of the radio communication apparatus set at a standby mode, wherein the radio communication apparatus providing radio communication service to the at least one terminal apparatus, wherein the radio communication apparatus is within a first cell which overlaps with a second cell, wherein the radio communication apparatus monitoring a strength of an uplink signal transmitted by the at least one terminal apparatus, wherein the radio communication apparatus detecting the at least one terminal apparatus that exists at the distance from the radio communication apparatus, based on the monitored strength of the uplink signal, wherein the radio communication apparatus switching the operation mode from the standby mode to an active mode based on the detection of the at least one terminal apparatus that exists at the distance, wherein the radio communication apparatus receiving a notification signal that indicates a failure of a handover, wherein the handover is based on the switching of the operation mode from the standby mode to the active mode, and wherein the radio communication apparatus switching the operation mode from the active mode to the standby mode based on the received notification signal; and instructing the at least one terminal apparatus to measure a quality of a signal, wherein the signal is transmitted by a base station, and wherein the instruction is based on the received message.

* * * * *